United States Patent
Shaw et al.

(10) Patent No.: US 10,412,275 B2
(45) Date of Patent: Sep. 10, 2019

(54) APPARATUS FOR MONITORING OF GRINDING MILL INTERIOR DURING OPERATION

(71) Applicant: MILLWATCHIP PTY LTD, St. Lucia (AU)

(72) Inventors: John Shaw, Toowoomba (AU); Rowan Bestmann, Harlaxton (AU); Rick Coker, Highfields (AU); Greg Kingdon, Holladay, UT (US)

(73) Assignee: Millwatchip Pty Ltd, Toowoomba, Queensland (AU)

( * ) Notice: Subject to any disclaimer, the term of this patent is extended or adjusted under 35 U.S.C. 154(b) by 42 days.

(21) Appl. No.: 15/322,020

(22) PCT Filed: Jul. 3, 2015

(86) PCT No.: PCT/AU2015/000382
§ 371 (c)(1),
(2) Date: Dec. 23, 2016

(87) PCT Pub. No.: WO2016/000024
PCT Pub. Date: Jan. 7, 2016

(65) Prior Publication Data
US 2017/0142302 A1 May 18, 2017

(30) Foreign Application Priority Data
Jul. 4, 2014 (AU) ................................ 2014902586

(51) Int. Cl.
*H04N 5/225* (2006.01)
*B02C 23/02* (2006.01)
*B02C 25/00* (2006.01)
*B02C 17/18* (2006.01)
(Continued)

(52) U.S. Cl.
CPC ......... *H04N 5/2252* (2013.01); *B02C 17/183* (2013.01); *B02C 17/1805* (2013.01);
(Continued)

(58) Field of Classification Search
None
See application file for complete search history.

(56) References Cited

U.S. PATENT DOCUMENTS

| 3,840,883 A * | 10/1974 | Choate ................. G03B 11/041 |
| | | 359/611 |
| 2012/0272904 A1* | 11/2012 | Hofman .................. A01J 5/017 |
| | | 119/14.02 |
| 2014/0338474 A1* | 11/2014 | Sepulveda Villalobos .................. |
| | | B02C 17/1805 |
| | | 73/865.9 |

FOREIGN PATENT DOCUMENTS

| CA | 2854957 A1 | 5/2013 |
| CN | 101745449 A | 6/2010 |

(Continued)

OTHER PUBLICATIONS

International Preliminary Report on Patentability of the Patent Cooperation Treaty dated Jun. 28, 2016 of International Application No. PCT/AU2015/000382 filed Jul. 3, 2015, entire document.
Written Opinion of the International Searching Authority dated Sep. 4, 2015 of International Application No. PCT/AU2015/000382 filed Jul. 3, 2015, entire document.

(Continued)

*Primary Examiner* — Kaitlin A Retallick
(74) *Attorney, Agent, or Firm* — Sorell, Lenna & Schmidt, LLP

(57) ABSTRACT

A monitoring device in the form of a camera in a protective housing is fixed to an outlet assembly of a feed chute and in a particular embodiment to a flange that extends outwardly about an outlet of the outlet assembly. The flange also supports a light also in a protective housing. The feed chute feeds ore into a grinding mill. The housings for the camera and light contain a viewing window which is cleaned by water jets and the window is protected by a visor which can be opened when the interior of the mill is to be recorded. The arrangement allows the interior of the mill to be monitored while the mill is grinding the ore.

11 Claims, 26 Drawing Sheets

(51) Int. Cl.
    *G06T 7/00*   (2017.01)
    *H04N 7/18*   (2006.01)
    *G03B 15/00*  (2006.01)
    *G03B 17/02*  (2006.01)
    *G03B 17/08*  (2006.01)

(52) U.S. Cl.
    CPC .............. *B02C 23/02* (2013.01); *B02C 25/00* (2013.01); *G03B 15/00* (2013.01); *G03B 17/02* (2013.01); *G06T 7/0004* (2013.01); *H04N 7/183* (2013.01); *G03B 17/08* (2013.01); *G06T 2207/30164* (2013.01)

(56) References Cited

FOREIGN PATENT DOCUMENTS

| | | |
|---|---|---|
| CN | 201505545 U | 6/2010 |
| JP | S5647480 A | 4/1981 |
| WO | 2013067651 A1 | 5/2013 |
| WO | 2014006500 A2 | 1/2014 |

OTHER PUBLICATIONS

International Search Report of the International Searching Authority dated Sep. 4, 2015 of International Application No. PCT/AU2015/000382 filed Jul. 3, 2015, entire document.

Examination Report of the European Patent Office dated Oct. 12, 2018 of European Patent Application No. 15815838.6 filed Jul. 3, 2015.

\* cited by examiner

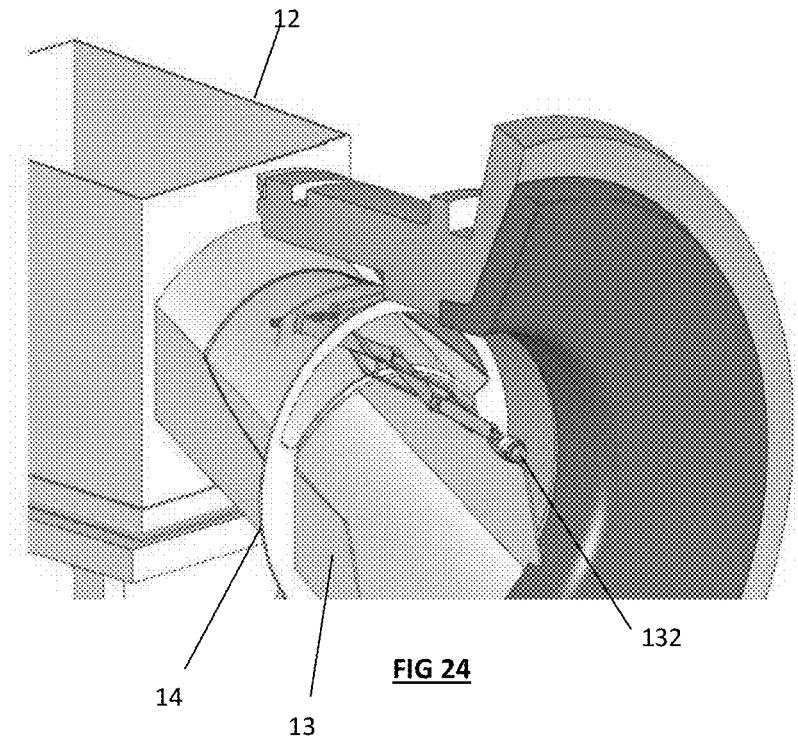
FIG 24
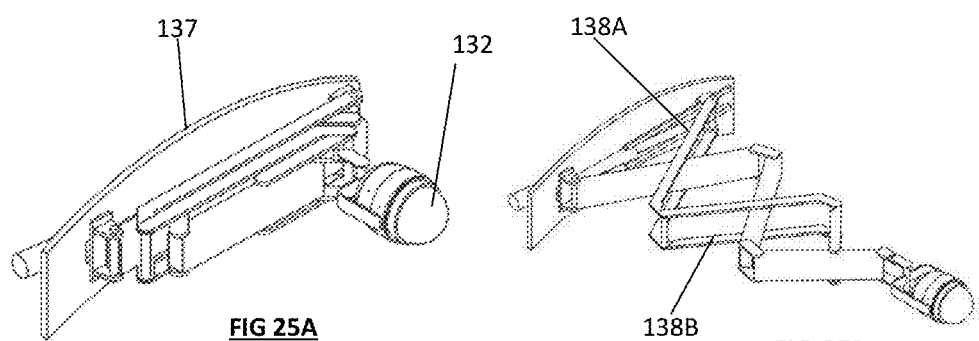
FIG 25A
FIG 25B
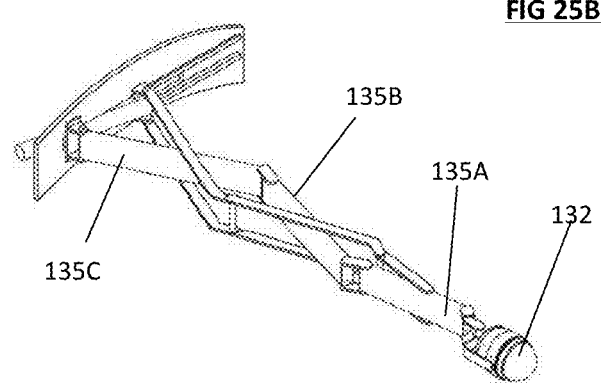
FIG 25C

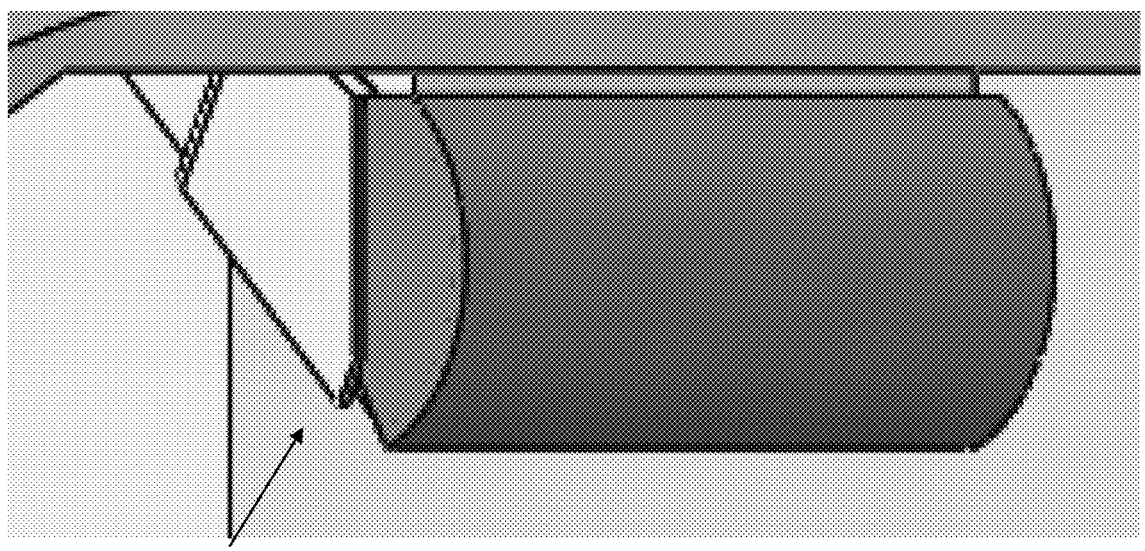
175  FIG 40

APPARATUS FOR MONITORING OF GRINDING MILL INTERIOR DURING OPERATION

TECHNICAL FIELD

The present invention is directed to improvements in the ability to monitor the inside of a grinding mill during operation. The invention is particularly suited to large ball mills used to grind ore. The invention will be described with reference to a ball mill but it should be appreciated that the invention may find suitability with other grinding mills.

BACKGROUND

Any references to methods, apparatus or documents of the prior art are not to be taken as constituting any evidence or admission that they formed, or form part of the common general knowledge.

SAG and ball mills are known types of grinding mills that are used to grind ores to smaller sizes. The mill typically comprises a main grinding body in the form of a rotating cylinder which is partially filled with balls, usually stone or metal, which grinds material to the necessary fineness by friction and impact with the tumbling balls. The cylinder has an entry inlet at one end and a discharge outlet at the other end. Material to be ground (e.g. ore) passes through the entry inlet of the cylinder and ground material passes out of the other end through the discharge outlet.

A feed chute is provided to convey the "raw" material into the entry of the main grinding body. The feed chute is also known as a mill chute or a conveyor chute, and sometimes simply as a chute. The feed chute typically comprises a trolley assembly on which an open top box like arrangement is supported. The box has an elongate outlet extending from a side wall. The feed chute can be rolled to the main grinding body of the mill such that the elongate outlet is pushed into the entry. Material to be ground can be dumped into the open box and will pass along the elongate outlet into the main grinding body. The elongate outlet can contain some form of outwardly extending protective surround flange which locates against or close to the walls surrounding the inlet of the grinding body to prevent material falling back out of the inlet.

SAG and Ball mills are commonly used in the grinding stages of mineral processing. During the grinding process, a large amount of heat is released.

It is a requirement to periodically inspect the inside of the mill for wear and tear to the liner, the balls or other parts and components inside the mill. The mill must be shut down and isolated prior to internal inspection.

A common technique is to retract the feed chute and have workers enter into the cylinder to inspect the components. Additional isolation processes are required for the removal and re-insertion of the feed chute. It is also a physically involved activity and the whole process often takes several hours due to the work required as well as the safety procedures that must be implemented.

Any time the feed chute is retracted there are potential safety risks. A grinding mill is a confined space which also brings safety risks. These risks are increased within a grinding mill due to the unstable environment. The surface is wet and uneven, making it difficult to walk on. As the mill cools, the grinding media (steel balls) can explode. Rocks and balls can become stuck in the liners around the mill and these can dislodge and fall on personnel entering the mill.

It is known to provide observation holes in the feed chute area through which observations can be made. These holes are covered over with steel plates when the mill is in operation and are only opened when the mill is shut down and isolated. This is a time consuming process and only allows limited viewing ability. Additionally, the area around the mill can be quite hazardous to operators and it is therefore not considered desirable to have an operator in close proximity to the mill for the purposes of viewing.

The cost of such downtime is often hundreds of thousands of dollars of lost production.

Another disadvantage with existing inspection techniques is that real time observations cannot be made while the mill is in operation to immediately observe any potentially adverse conditions. One reason for this is the extremely hostile conditions inside the mill. Real time observations may increase grinding efficiency, allow for improved liner design, provide information to adjust the mill rotation speed, ore feed rates, and mill ball feed rates among others.

The interior of the mill, as mentioned above, comprises extremely hostile conditions and any monitoring device merely placed inside the mill will almost certainly be pulverised or damaged beyond repair.

It is considered that a visual observation of the interior of the mill can provide the most important source of data and therefore visual data of the interior of the mill during use is considered to be highly valuable providing that the visual date can be secured reliably and without constant replacement of the monitoring device in the mill.

There would be an advantage if it were possible to monitor the inside a mill while it is in operation. There would be a particular advantage if it were possible to visually monitor the inside of the mill during operation.

It is an object of the present invention to provide a method and apparatus that can monitor the inside of a mill while it is in operation.

SUMMARY OF THE INVENTION

In a first aspect of the invention, there is provided a feed chute for a grinding mill, the feed chute having an outlet assembly including an elongate outlet adapted for insertion into an entry opening of the main grinding body of the grinding mill in use, and at least one monitoring device fastened to the outlet assembly at a position for viewing an interior of the grinding mill in use.

In a preferred embodiment of the invention the elongate outlet assembly includes a flange extending outwardly about the elongate outlet to at least partially seal the entry opening when the outlet is inserted into the entry opening wherein said monitoring device is supported on the flange.

The at least monitoring device is preferably located in a protective housing.

It is preferred that the at least one monitoring device comprises a camera.

Preferably the feed chute comprises a viewing screen on the housing to enable the monitoring device to monitor the interior of the main grinding body.

At least one nozzle may be provided on the housing adapted to spray liquid onto the screen to clean the screen.

It is preferred that the feed chute comprises a protecting visor adapted to movement between a protection position where the visor protects the screen and a non-protection position where the visor does not protect the screen.

At least one illuminating device may be provided which is supported by the outlet assembly.

Preferably the at least one illuminating device is supported by the flange and located in a protective housing.

The housing may be adapted for mounting to a ceiling of the outlet with a screen arranged at one end thereof, the housing including said monitoring device and at least one illuminating device.

Preferably a screen is provided on the housing to enable the illuminating device to illuminate the interior of the main grinding body.

At least one liquid nozzle may be provided on the housing adapted to spray liquid onto the screen for the illuminating device to thereby clean the screen.

Preferably the housing is supported on a front side of the flange.

The at least one monitoring device is preferably arranged for operation remotely from the feed chute.

According to a further aspect of the present invention there is provided a grinding mill comprising a main grinding body having an entry inlet and a discharge outlet, a feed chute, and at least one monitoring device in a protective housing in the mill to monitor the inside of the mill while the mill is in operation.

Suitably, the at least one monitoring device is provided on the feed chute.

The grinding mill assembly may comprise a SAG mill.

The main grinding body may comprise a cylinder containing weights to crush material fed into the main grinding body. The weight may comprise balls, rods and the like.

In an embodiment of the invention, the grinding mill assembly may be of known design.

The monitoring device may comprise an image capturing device such as a camera. The camera may capture electromagnetic radiation in the visible spectrum, infra-red, ultraviolet, microwave, x-ray spectrum and the like.

The monitoring device may comprise a laser emitter and receiver to enable laser monitoring of the inside of the mill. The laser may include a laser scanner to build a 3D image of the mill wall, the liners in the wall etc. to determine wear rates and the like. The device may comprise a 3D white light emitter.

The monitoring device may comprise a thermal imaging device.

The monitoring device may comprise a sonar imaging device.

The monitoring device may comprise one or more devices to enable, for example, visible and infra-red imaging to be conducted.

The mill may include at least one illumination device to illuminate the interior of the mill. The device may comprise at least one infra-red emitter. Suitably, the emitter is in a protective housing in the mill. The housing may be identical or similar to the housing protecting the monitoring device. Suitably, the mill contains two or more spaced protective housings each containing at least one emitter to provide consistent illumination of the interior of the mill.

The radiation emitter may emit radiation in the visible spectrum.

The emitter may comprise a combination of different types of emitters, for instance, a combination of visible and IR radiation.

The protective housing may comprise an armored housing body. The body is suitably made of steel such as stainless steel to provide corrosion resistance protection to the components in the body. Alternatively, the body may be made of materials other than steel. For instance, the body may be made of other metals, metal alloys, non-metal materials such as impact resistance plastics, reinforced materials including Kevlar, laminated materials and the like.

The body may have any suitable shape and size. The shape and size will depend, inter alia, on the shape, size, and number of monitoring devices in the body. It is envisaged that the body will be substantially cuboid in shape though it could be otherwise, for example it may have a cylindrical body.

The body is suitably provided with at least one area through which the monitoring device can send or receive data from the inside of the mill. If the monitoring device comprises a camera, the area will typically comprise a transparent screen to enable the camera to receive visible or infrared data from the inside of the mill. Of course, if the monitoring device comprises an x-ray emitter and receiver, the at least one area need not be transparent to the visible spectrum and only needs to be transparent or at least partially transparent to the radiation wavelength.

In most instances, it is considered that the monitoring device will comprise a visible or infrared camera and therefore the body will contain a viewing screen/window.

The monitoring device may be adjustably mounted relative to the protective housing. In one form, the monitoring device can pan or tilt.

Cleaning means may be provided to clean the screen. The cleaning means may comprise pressurized air. The protective housing may be provided with or associated with, or be in operational association relative to a source of pressurised air directed to the screen to clean the screen. An air knife may be provided to provide the pressurised air to clean the screen. The air knife may be provided on the housing and may be positioned in an upper part of the screen to blow pressurised air onto the screen.

More than one source of pressurised air may be provided. The pressurised air may be replaced by other gasses if desired (for instance nitrogen).

Additional or alternative cleaning means may be provided. This cleaning means may comprise a liquid spray directed against the screen to clean the screen. The liquid spray may comprise a water spray. At least one spray nozzle may be provided to direct liquid towards the screen to clean the screen. The spray nozzle may be provided adjacent the screen, or in operational association with the screen.

The liquid may comprise water, water mixtures, non-aqueous mixtures, surfactant, dispersants, and the like.

The liquid may include some solid material to provide a slight abrasive action to the screen to assist in cleaning the screen.

The pressurised air may also include some solid material also to provide a slight abrasive action to the screen to assist in cleaning the screen. It is of course desirable that any such solid material is chosen to not unnecessarily damage the screen.

The cleaning means may be provided continuously or intermittently. Suitably, the pressurised air is provided continuously and the liquid cleaning can be provided "on demand".

The screen may be protected by a protective sacrificial cover that can be removed if damaged. The cover may comprise a peel off layer. Suitably, a number of such layers is provided which can be peeled off on demand to present a fresh clean screen.

A protective cover or visor may be provided. The visor may be operable between a protecting position where the visor is in front of the screen and a retracted position where the visor is moved away from the screen. The visor may be hingedly or otherwise attached relative to the protective cover and may be operated in any suitable manner. The visor may be made of strong material such as steel. Other materials may also be used in the manufacture of the visor such as metals other than steel and non-metal materials such as urethanes. The visor may be transparent and may comprise a polycarbonate or similar. The visor may be operated by pull cables with one cable enabling the visor to be pulled to the open position and another cable enabling the visor to be pulled to the closed protecting position. Alternatively, the visor may be operated by a motor or by any other suitable means.

The screen may also be protected by a protective grid or mesh which is fixed or hinged and which contains openings small enough to prevent damage to the screen by larger material (e.g. ore bodies) in the mill but still enabling the monitoring device to monitor the interior of the mill.

Cooling means may be provided to cool the protective housing. The cooling means may comprise air cooling, liquid cooling, thermoelectric cooling and the like. In a preferred embodiment, the cooling means comprises pressurised air passing through the protective housing. The air (or other gas) may be cooled prior to entering the housing.

The mill suitably includes at least one radiation emitting device to illuminate the interior of the mill in a manner to enable the monitoring device to record the interior of the mill. If the monitoring device comprises an infrared or visible camera, the radiation emitting device will typically comprise an infrared emitter or a visible light emitter. Suitably, the radiation emitting device is protected within a housing identical to or similar to that described above. This housing may also be protected by a visor which may be similar to that described above.

It is envisaged that the radiation emitting device and the monitoring device may be located in a single protective housing.

As mentioned previously, it is particularly preferred that the protective housing is positioned in a clear space on the feed chute flange.

In this position, the monitoring device can observe the length of the interior of the main grinding body.

In another form the invention comprises a monitoring device adapted for placement in a grinding mill, the monitoring device being in a protective housing containing at least one area through which the monitoring device can send or receive data from the inside of the mill, and cleaning means to clean the at least one area.

The monitoring device may be as described above.

The protective housing may be as described above.

The cleaning means may be as described above.

Cooling means may be provided and which may be as described above.

In another form the invention comprises a radiation emitter adapted for placement in a grinding mill and to illuminate the interior of the mill, the radiation emitter being in a protective housing containing at least one area through which the radiation emitter can emit radiation into the mill, and cleaning means to clean the at least one area.

The radiation emitter may be as described above.

The protective housing may be as described above.

The cleaning means may be as described above.

Cooling means may be provided and which may be as described above.

An access panel may be provided adjacent the housing to enable the housing to be accessed, for instance, to remove a peel off layer, or to repair or further clean the monitoring device.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 24-25C Illustrate the scissor like telescoping camera assembly according to FIGS. 22-23.

FIG. 40 Is a detail view corresponding to FIG. 38 showing the protective visor in the closed position.

DETAILED DESCRIPTION OF PREFERRED EMBODIMENTS

Figure 1:
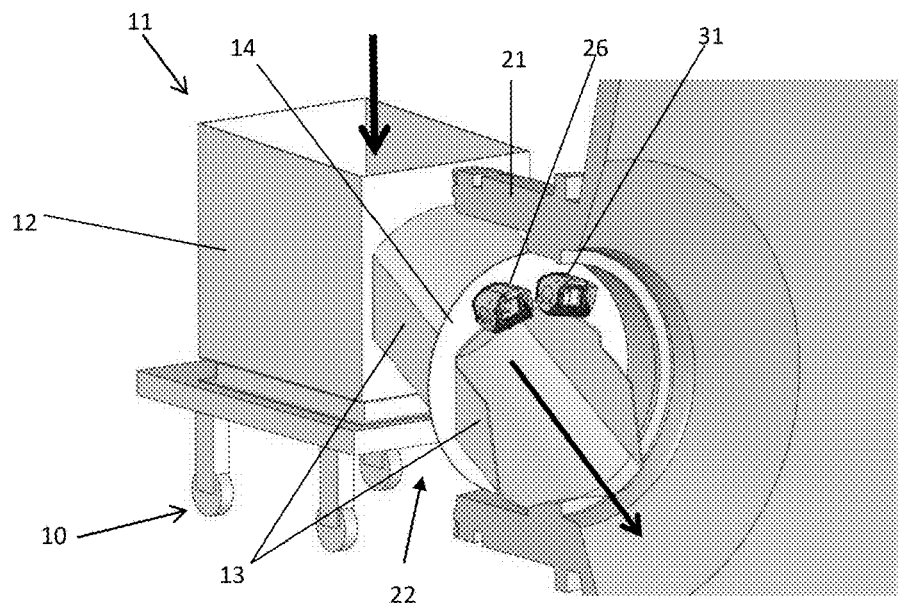
FIG. 1 Illustrates a feed chute for a grinding mill and containing a monitoring device according to an embodiment of the invention.

Referring initially to FIG. 1, there is illustrates a feed chute 11 generally of known design. The feed chute typically comprises a trolley assembly 10 on which an open topped box like arrangement 12 is supported. The box communicates with an outlet assembly 22 that has a chute-like elongate outlet 13. Material to be ground can be dumped into the open box 12 and will pass along the elongate outlet 13 into the grinding body (see FIG. 2). The outlet assembly 22 further comprises an outwardly extending protective surround flange 14 which is disposed about the elongate outlet 13. In use the flange 14 locates against or close to the walls surrounding the inlet that opens into the grinding body to prevent material falling back out of the inlet.

Figure 2:
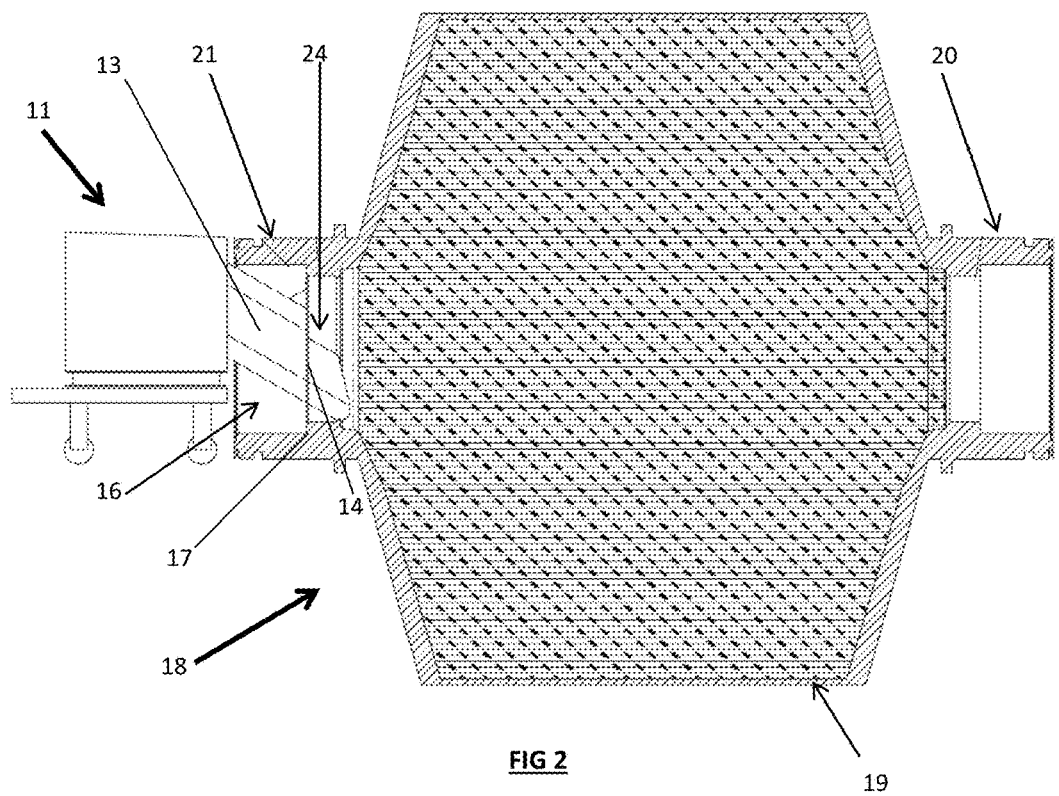
FIG. 2 Illustrates broad details of a ball mill suited to the present invention.

FIG. 2 illustrates a section view of a SAG mill particularly suited to the present invention. In FIG. 2, the SAG mill 18 has a main cylindrical body 19 in which material is ground. The main cylindrical body 19 rotates about its longitudinal axis and in the process balls located in the cylindrical body crush the material in a known manner. In this process, heat is liberated.

The cylindrical body 19 has a discharge chute 20. The other end of the cylindrical body has an entry inlet 16. The inlet comprises an elongate generally cylindrical opening 21 containing an internal trunnion 17.

The feed chute 11 is rolled to the mill entry inlet 16 (see FIG. 2) such that the inclined elongate outlet chute 13 enters into the inlet 16. Chute contains the outwardly extending flange 14. The main purpose of the flange is to provide a means of sealing the mill so that ore does not fall back out of the entry. A seal or sealing mechanism is fitted to the mill trunnion 17 and this seals against the feed chute flange. The position of the flange 14 in the mill entry creates a clear space 24, and in the preferred embodiment, the monitoring device 31 and illuminating device 26 is supported by flange 14 such that these devices locate in this clear space 24. The positioning of the monitoring device/illuminating device reduces the possibility of them being damaged. Furthermore, in this position, the monitoring device and the illuminating device are able to monitor and illuminate the interior of the body portion 19 in which the grinding takes place.

This enables a monitoring device such as a camera 31 to provide high resolution, close-up zoom inside the mill without retracting the feed chute and shutting down the mill. Thus, many of the inspection functions can be completed remotely. The time and safety savings are immense.

In addition it is now possible to view the inside of a mill when it is operating. The benefits of this include increases in grinding efficiency, improved liner design, information to adjust the mill rotation speed, ore feed rates, and mill ball feed rates among others.

In an embodiment, the components which enable the preferred embodiment of the invention to be carried out include:

An armoured camera enclosure/protective housing 30
A camera 31
An armoured lighting enclosure/protective housing 30
A light emitter 26
A power/data control enclosure 59
An air/water control enclosure 60
A computer and monitor The protective housing 30 (see at least FIGS. 3 and 4) is a custom design made of robust, corrosion resistant material such as stainless steel to provide corrosion protection and to protect the camera from dust, water, mud and flying rocks.

Figure 2A:
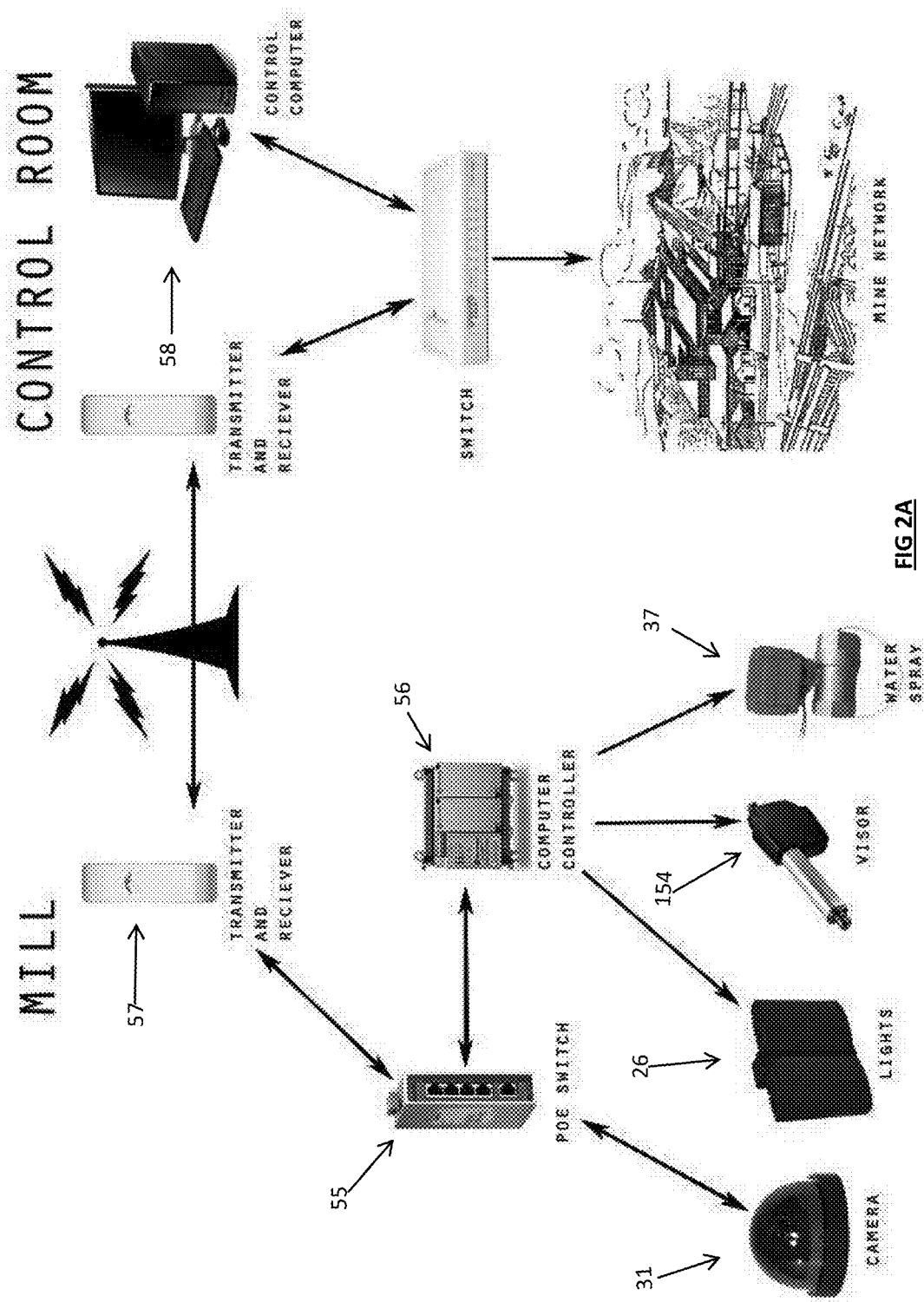
FIG. 2A is a schematic diagram of a system according to an embodiment of the present invention for monitoring a mill such as that illustrated in FIG. 2.
Figure 2B:
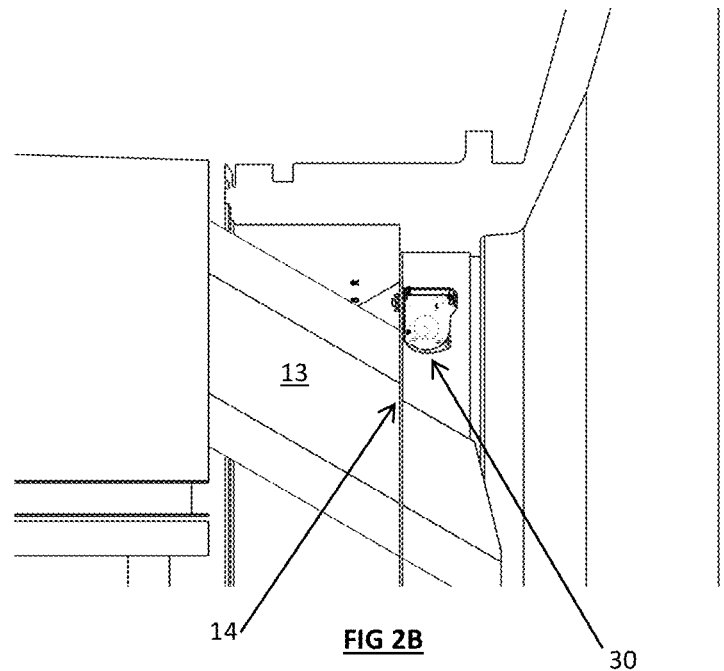
FIG. 2B Illustrates a monitoring device in a protective housing attached to the flange of the feed chute.

FIG. 2B illustrates fitment of the camera in its housing 30 to the flange 14 of the feed chute outlet 13.

Figure 2C:
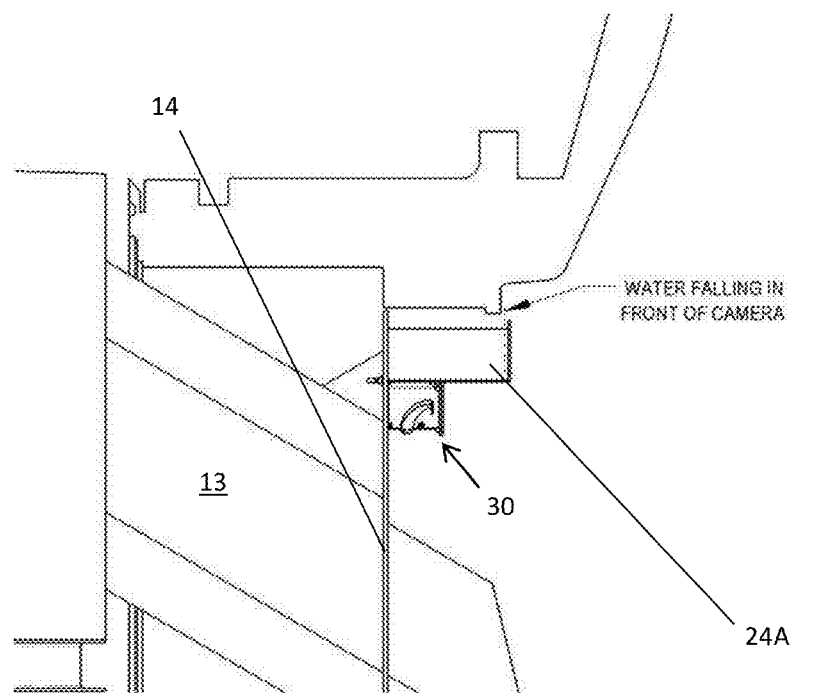
FIG. 2C Illustrates the use of a shroud to protect a camera assembly according to an embodiment of the present invention from water within the mill.

FIG. 2C illustrates the use of a cover 24A above the camera and lighting enclosures. The cover may provide additional protection and it also prevents water at the mill throat from obstructing the view. Water is added to most grinding processes and with the inside of the mill being typically very wet, water tends to run down the vertical faces of the mill. Water may also be fed into the mill from the outside. This water will typically fall in a sheet in front of the camera, but not necessarily in the grinding region. The cover as shown is fitted to the feed chute or to the camera and/or light enclosure and extends into the mill just far enough to deflect the water sideways and create a clear viewing space.

Figure 2D:
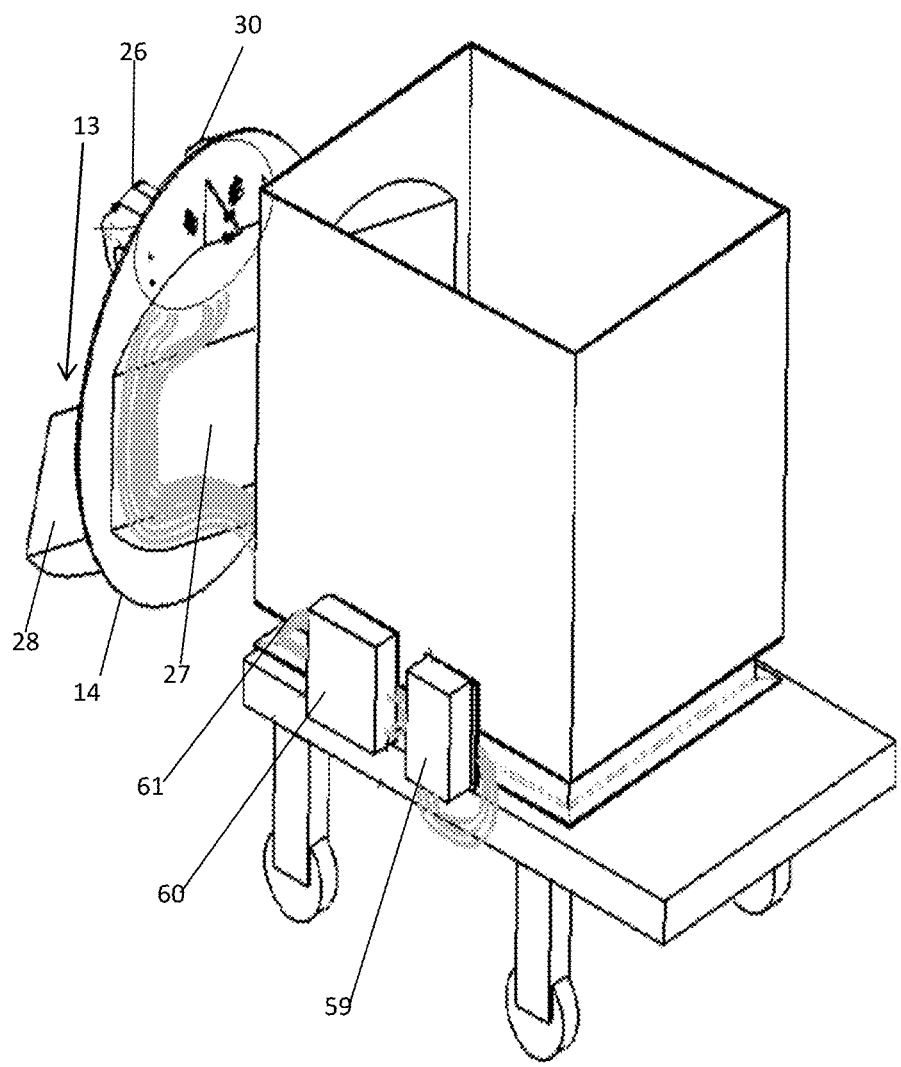
FIG. 2D is a rear view of the feed chute of FIG. 1.

FIG. 2D is a rear view of the trolley mounted feed chute 11. The circumferential flange 14 is better illustrated which is attached to and extends about the elongate outlet 13. Specifically, the outlet 13 has a rear portion 27 which is fully enclosed and a front portion 28 which is not fully enclosed and is of a general U shaped configuration. Flange 14 is welded or otherwise attached at the juncture between the rear enclosed portion 27 and the front open U shaped portion 28. The camera in its protective housing 30 and the illuminative device 26 in its protective housing are fixed to the front of the flange above the rear portion 27 of the outlet 13. FIG. 2D further illustrates an electrical/data cabinet 59, a cabinet 60 containing the water actuator controls and visor pull cables 61. These will be described in greater detail below but illustrate the "self-contained" unit that the feed chute 11 becomes.

Figure 2E:
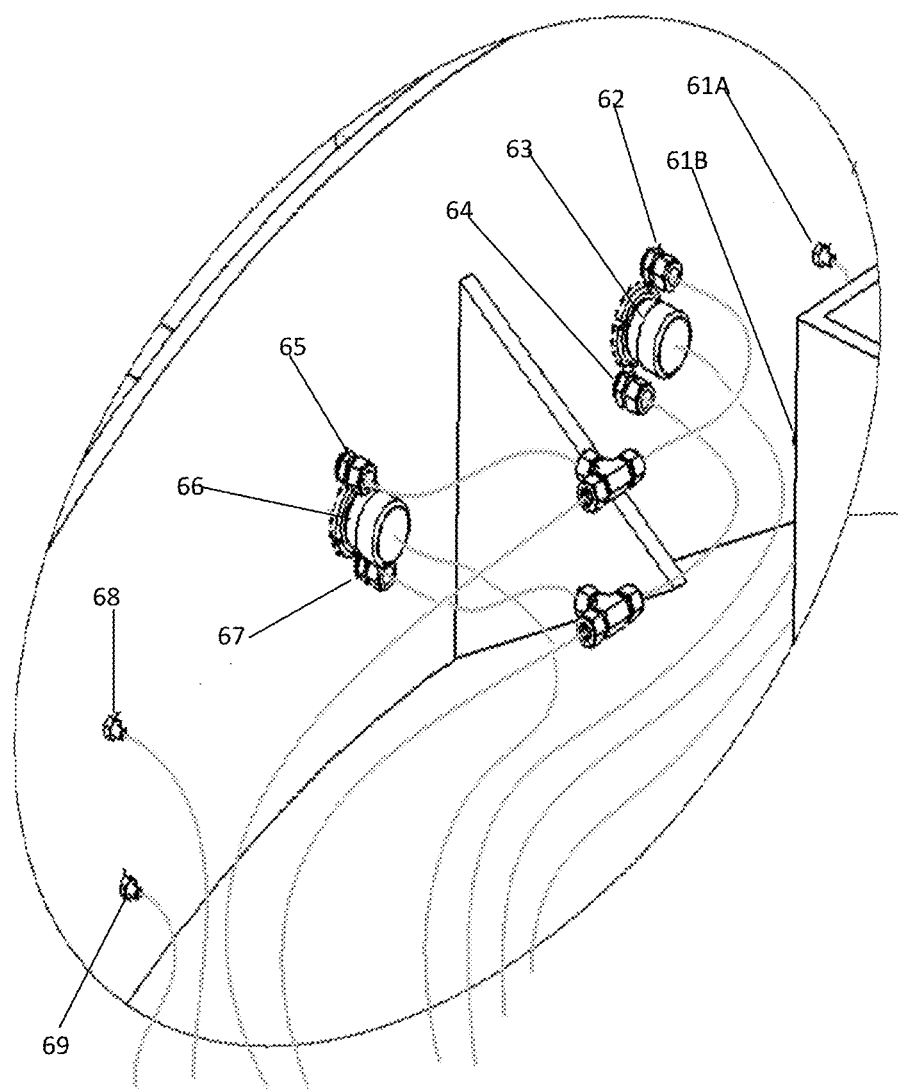
FIG. 2E is a detail view of the flange portion of FIG. 2D.

FIG. 2E illustrates the rear of flange 14 around the area where the camera and light are fitted and particularly illustrating the various openings through the flange. Specifically, FIG. 2E illustrates an opening 61A for the camera visor pull cable to close the visor, an opening 61B for the camera visor pull cable to open the visor, a camera water spray ⅝ inch tube fitting 62, a camera power and signals 40 mm conduit fitting 63, a camera water spray ⅝ inch tube fitting 64, a light (radiation emitter) water spray ⅝ inch tube fitting 65,67, a light, power and signals 40 mm conduit fitting 66, a lights visor pull cable opening 68 to close the visor, and a lights visor pull cable opening 69 to close the visor.

FIG. 2A is a schematic diagram of a system according to an embodiment of the present invention for monitoring a mill such as that illustrated in FIG. 2. The monitoring device (a camera 31 in FIG. 2A) transmits its signal or data from the protective housing (not illustrated in FIG. 2A) inside the mill via hard wired cable to the electrical box containing a POE Switch unit, 55 which then routes the signal or data through to a HMI, PLC or on-board computer 56 which is housed in or near the electrical box. Alternately, the signal or data can be sent directly from the POE Switch unit to a wireless transmitter 57 which send the signal or data to a receiver near or in the control room, which feeds the information into the control room computer 58. The computer, whether on board or in the control room, then displays the information via a software package that is made available on an IP address accessible by the mine site. The software is designed to control the image capturing device as well as all features of the system, transmitting the control signals using the same hardware and information path as described above. The software displays the controls onscreen for the operation of the camera 31, lights 26, retraction and extension of the protective visor (by operation of the linear actuators 154/155—illustrated in FIG. 29), and water sprays 37.

Figure 3:
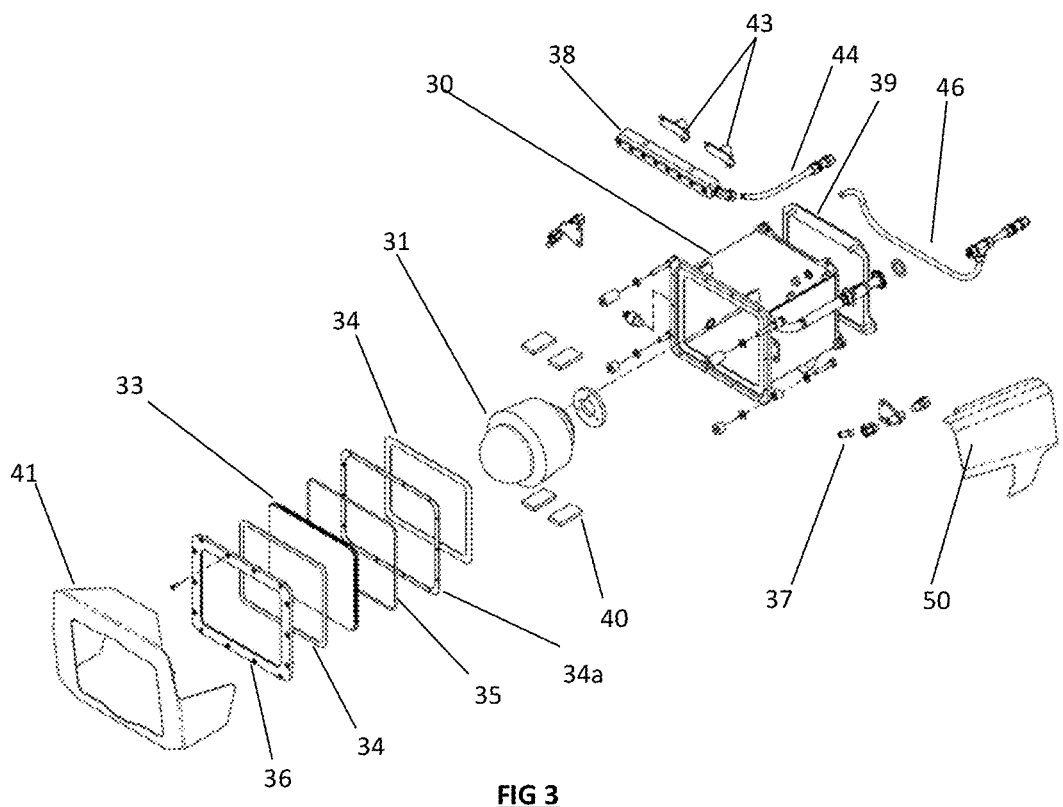
FIG. 3. Illustrates an exploded view of a camera assembly according to an embodiment of the present invention.
Figure 4:
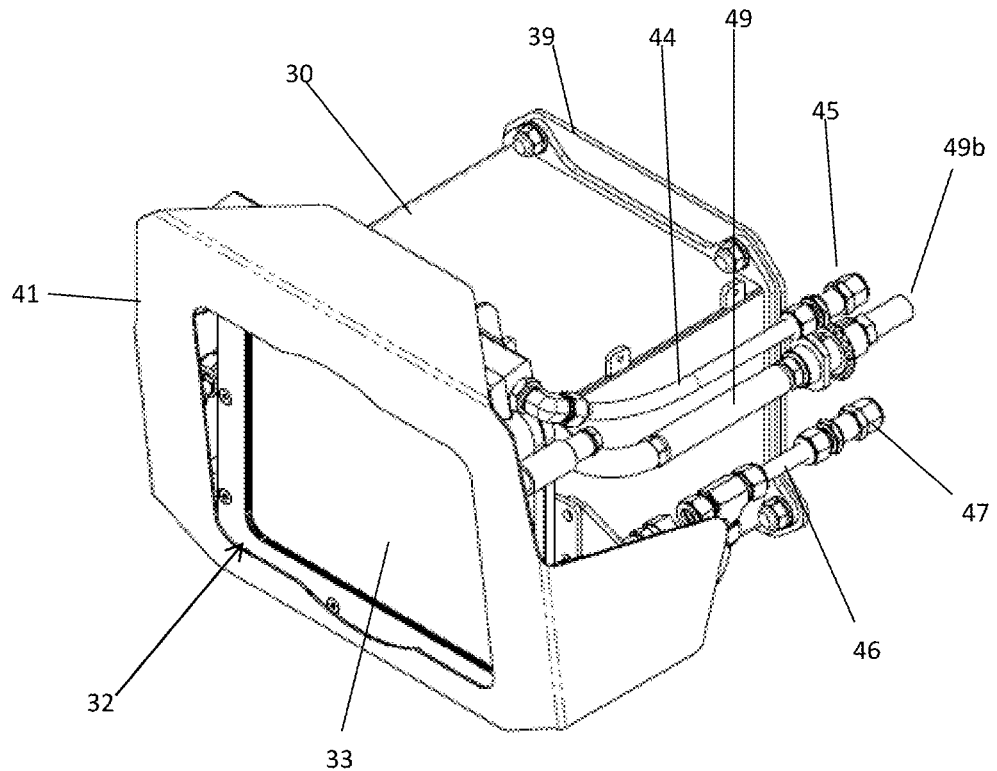
FIG. 4. Illustrates an assembled view of the camera assembly without the side protector.
Figure 5:
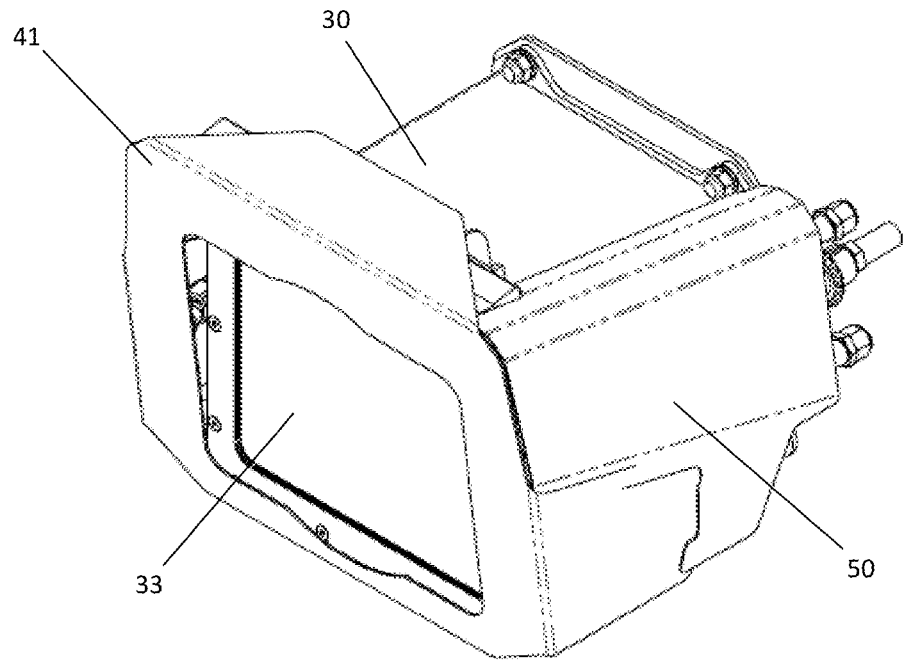
FIG. 5. Illustrates the assembled view of FIG. 4 with the side protector attached.
Figure 6:
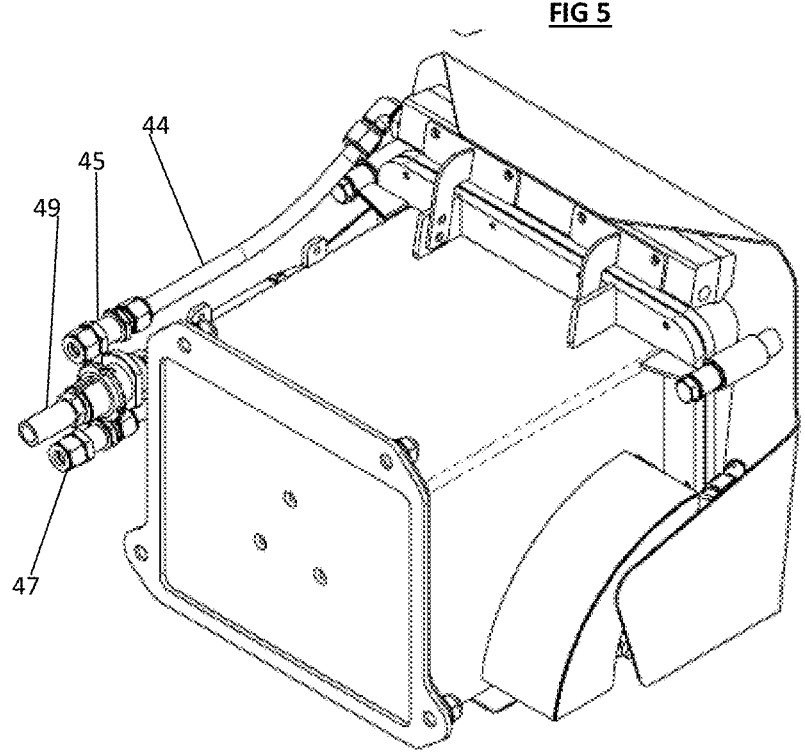
FIG. 6. Illustrates a rear view of the assembled camera assembly.
Figure 7:
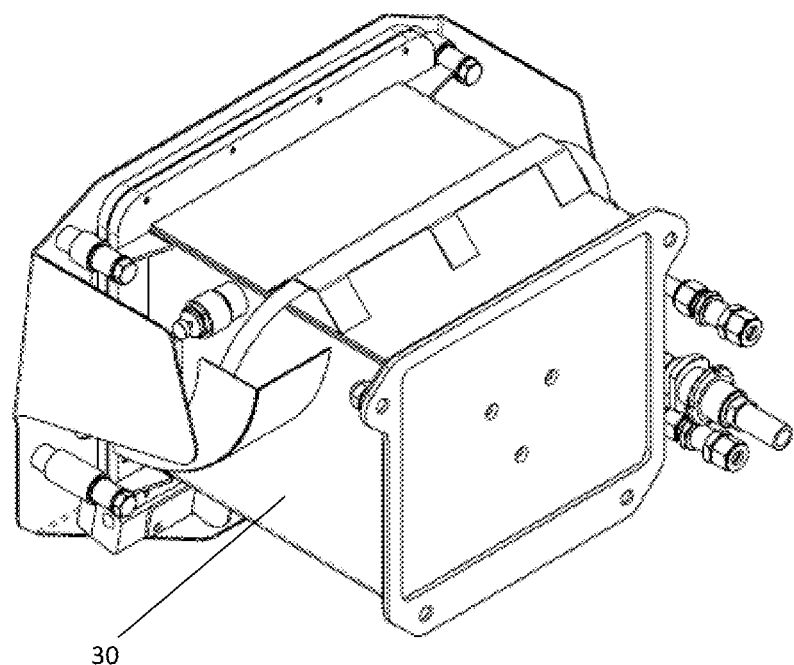
FIG. 7. Illustrates a rear view from a different angle.
Figure 8:
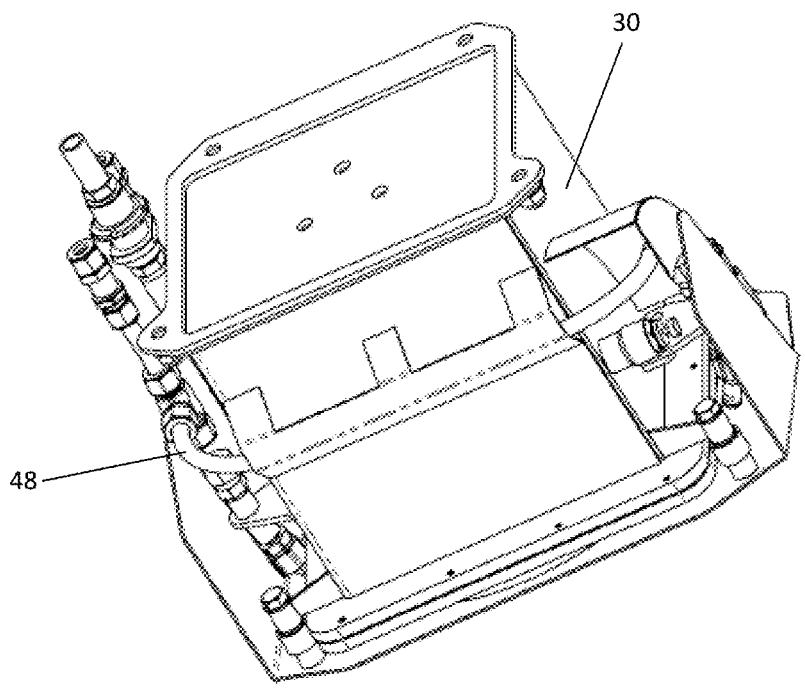
FIG. 8. Illustrates a below view of the assembled camera assembly.
Figure 9:
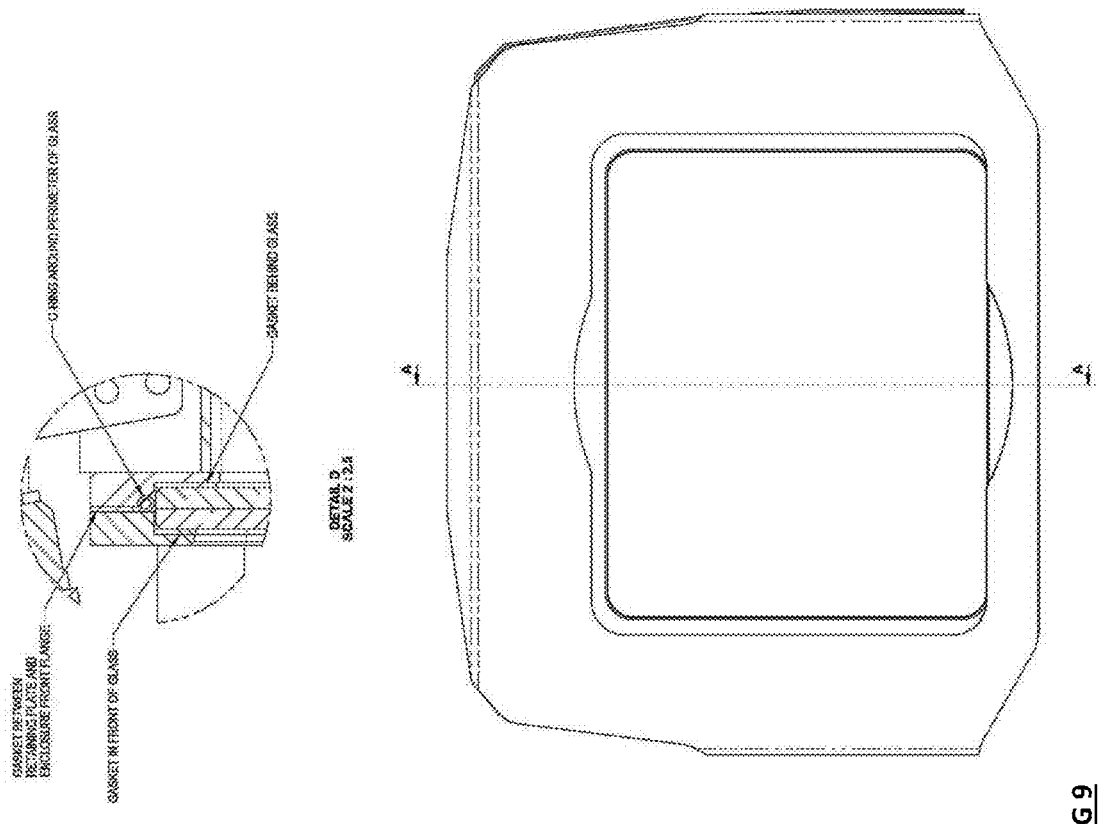
FIG. 9. Illustrates certain details of the camera assembly and particularly the attachment of the glass screen.
Figure 9:
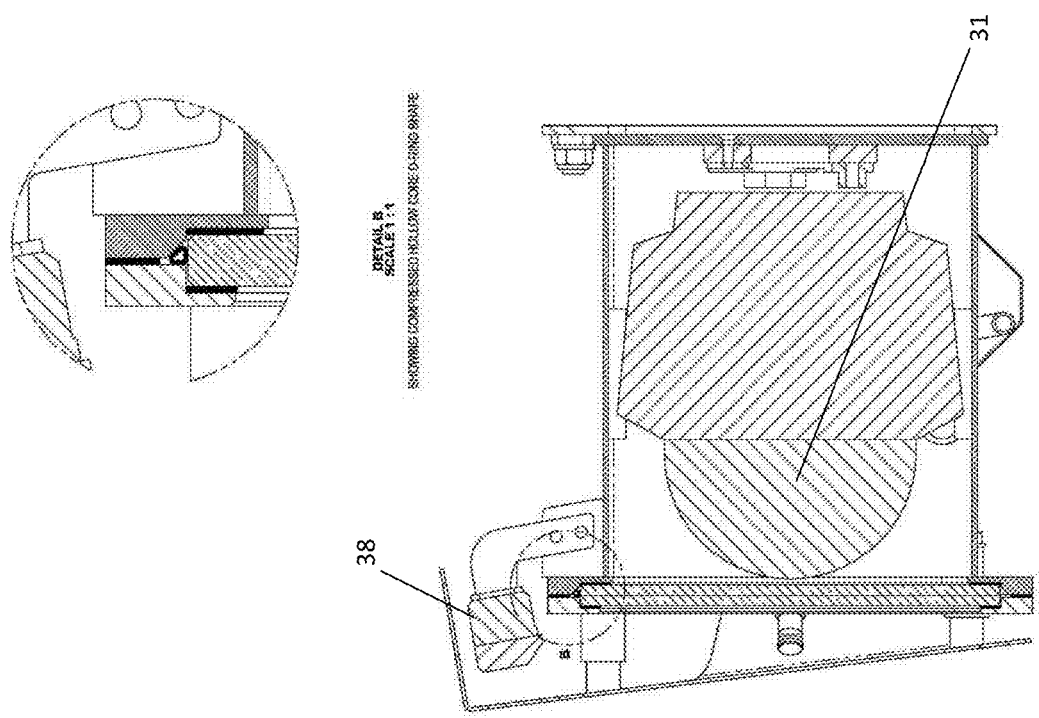

Referring now to FIG. 3, the housing 30 contains a PTZ (pan tilt zoom) camera 31 allowing the user to move around and zoom to view throughout the shell and discharge end of the mill.

The viewing window for the camera in the enclosure is sealed with thick laminated glass 33 to provide protection from dust, water, mud and flying rocks. The glass 33 is sealed in such a way as to prevent moisture entering the enclosure whilst not applying too much stress on the glass so that it is more susceptible to breakage or cracking if impacted.

The sealing arrangement has soft gasket type seals 34 in front of and behind the glass, with another between the enclosure flange and the glass retaining plate 34a. In addition there is an O-ring 35, preferably in the form of a hollow-core O-ring to make it softer, around the perimeter of the glass which sits inside a chamfered recess. As the screws around a retaining plate 36 are tightened, the compression is controlled either by shims or by measurements in order to only apply enough pressure to seal, but not enough to stress the glass. The gaskets in front of the glass and between the two plates form a first protective seal, the O-ring forms a second protective seal and the gasket behind the glass forms a third protective seal. So in this way there are 3 layers of sealing with minimal pressure on the glass.

Figure 26:
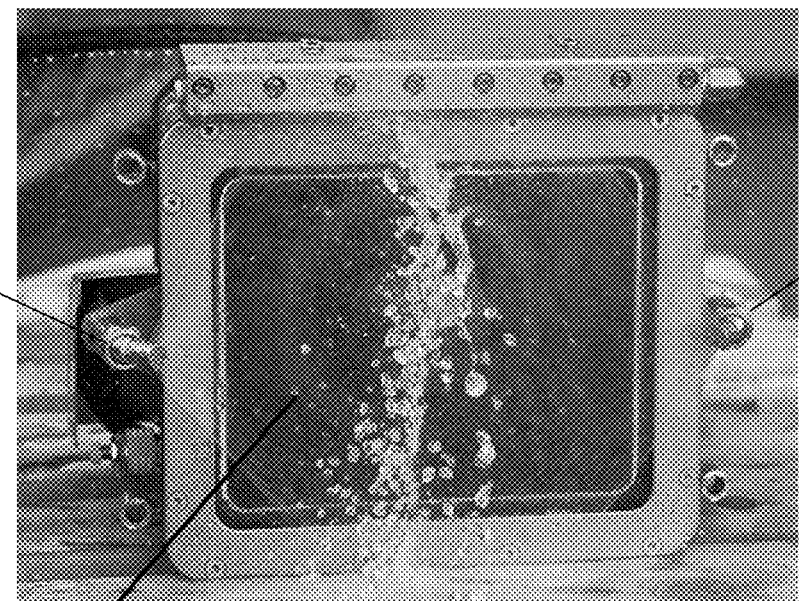
FIG. 26. Illustrates the front of the camera assembly of the first embodiment being cleaned with a water spray.
Figure 27:
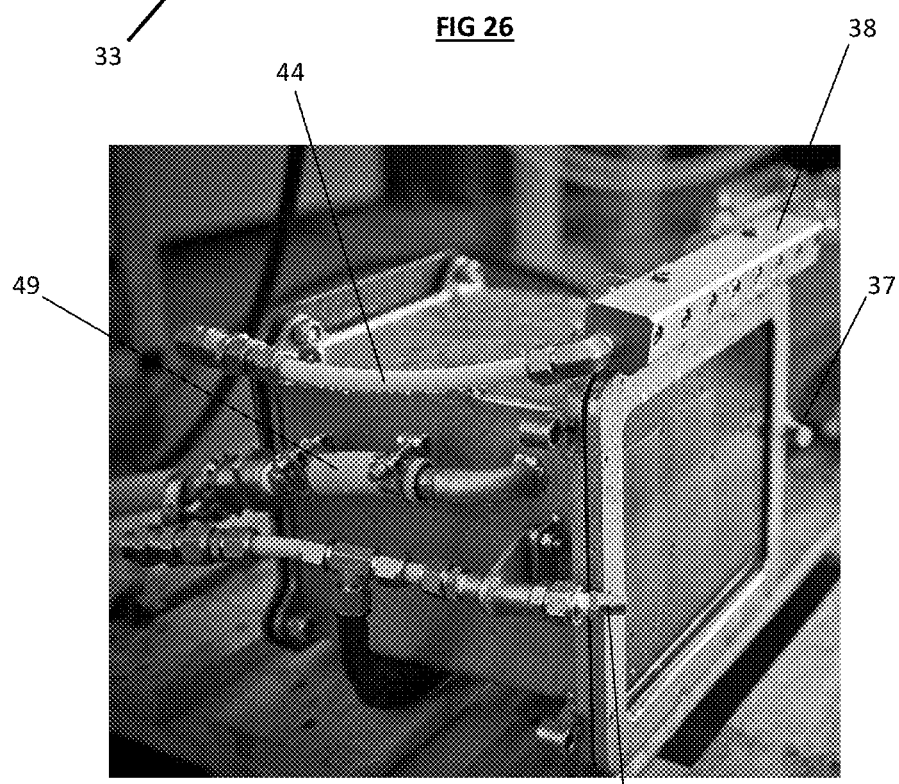
FIG. 27 Illustrates an infra-red lighting (illumination) assembly and particularly illustrates the air knife in an upper part of the assembly and the water jet on each side of the assembly.

The glass has cleaning means placed around it in the form of two water nozzles 37 (see particularly FIGS. 26 and 27) pointing towards each other to the left and right of the glass, with an additional air knife 38 which runs across the length of the top of the glass pointing downwards.

The air knife placement is designed to prevent the build up of dust and mud on the glass preventing a clear field of view for the camera. The water nozzles are designed to be intermittently used when the air knife cannot sufficiently stop the dust and mud debris and there is a build up of residue on the glass over a period of time.

In order to clean the glass with water, the air supply is switched off (via the Air/Water control box) and the water supply is turned on (via the Air/Water control box) for a short period allowing a water spray to wash the glass via the water nozzles. The water supply is then turned off and the air supply switched back on (via the Air/Water control box) resuming the air knife protection on the glass. The air and water cleaning may also operate at the same time at the operator's discretion.

Power is supplied to the PTZ camera via a POE (Power over Ethernet) connection through a cable that runs through an entry in the side of the housing. Data from the camera is received via the POE cable which runs through a hole drilled in the flange of the feed chute and returns to the Power/Data Control Box.

The air supply and water supply are run from the Air/Water control box to the camera enclosure via separate hosing which runs from outside the feed chute through holes drilled in the flange of the feed chute and terminate at the water spray nozzles and air knife. Cooling air is introduced to inside the camera enclosure via the POE cable conduit 49 from the Air/Water control box.

The lighting enclosure consists of two high powered long range infra-red emitters that provide consistent illumination throughout the mill.

The enclosure, in the presently described preferred embodiment, is identical to the camera enclosure, the only difference being the 24V power cables that supply the lights (instead of the Ethernet cable that provides power to the camera and returns the data).

Power/Data Control Enclosure

The enclosure is a sealed. The enclosure contains a 110-240V power regulator that regulates the voltage to 24V which powers multiple onboard systems—including:

- The POE (Power Over Ethernet) module that sends 24V power to the camera via the sheathed CAT5 cable and receives data from the camera via the same cable and feeds it into the WiFi transmitter.
- 24V power is sent via a sheathed power cable to the lighting enclosure
- The onboard Wifi transmitter which receives the camera signal via the POE component and transmits it wirelessly to the receiving computer in the control room displaying the camera view and recording it to HD.

Air/Water Control Enclosure

The Air/Water Control Enclosure is a sealed stainless steel compact enclosure. The enclosure accepts both air and water that is provided onsite.

The site air is of varying quality and pressure, and needs to be cleaned and regulated at a consistent pressure. An air filter and regulator achieves this and then provides air to the camera and lighting enclosures.

A separate feed of cleaned air is also introduced to the conduit 49 containing the POE cable from the camera enclosure and the conduit containing the 24V power for the lighting enclosure.

Site water, preferably potable for cleanliness, is connected to the enclosure and it passes through a water filter, regulator and on/off valve. The cleaned water is then provided to the camera enclosure and the lighting enclosure for glass cleaning via the spray nozzles.

Referring now in greater detail the various parts of the invention, and initially to FIGS. 3-11, there is illustrated a monitoring device in a bolt on protective housing 30. The protective housing 30 can be bolted to, or otherwise fixed to a steel plate 39 which is affixed (preferably by welding) to the feed chute flange 14 and is in the clear space area 24. The monitoring device is a camera.

Figure 14:
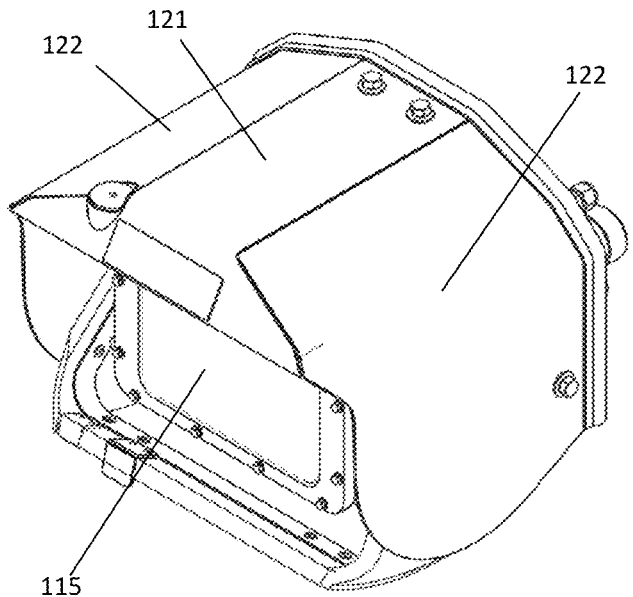
FIG. 14 Illustrates the assembly of FIG. 13 with a further protective top and side shroud attached.

An exploded view of the assembly is illustrated in FIG. 3. A camera 31 is supported by cushioning supports 40 and is located within housing 30. The front of housing is open and is closed off by a glass screen 33. Glass screen is mounted via various gaskets 34, an O ring 35 and a glass retainer 36 as described above. A front protective guard 41 is fitted to the front of the housing 30. The glass screen 33 is kept clean by an air knife 38 mounted to the top front of the housing 30. Air knife 38 is particularly illustrated in FIGS. 14 and 15. Air knife 38 has a thin opening along its length to blow pressurised air down over the glass screen. The air knife is mounted via brackets 43 (see FIG. 3) to the housing. An air hose 44 (see FIGS. 3, 4) is attached to the air knife, extends to a rear of the housing and terminates in a coupling 45 at the flange (see FIG. 4). On the other side of the flange the hosing continues to the Air/Water control box.

Glass screen is also cleaned periodically by a water spray. Nozzles 37 (see FIGS. 26 and 27) are fitted to each side of the housing and are positioned to spray pressurised water over the front of the screen. Each nozzle is connected to a water hose 46 which terminates in a coupling 47 at the flange. On the other side of the flange the hosing continues to the Air/Water control box. A connecting hose 48 (see FIG. 8) enables both nozzles to be connected to a common water supply.

As the mill can get hot in use, cooling means can be provided to cool the inside of the housing. The cooling means comprises pressurised air passing through conduit 49 and through the housing. In this way the temperature may be controlled and potential fogging of the screen can be dealt with. The various hoses and conduits are protected by a fitted side protector 50 (see FIG. 3).

Figure 10:
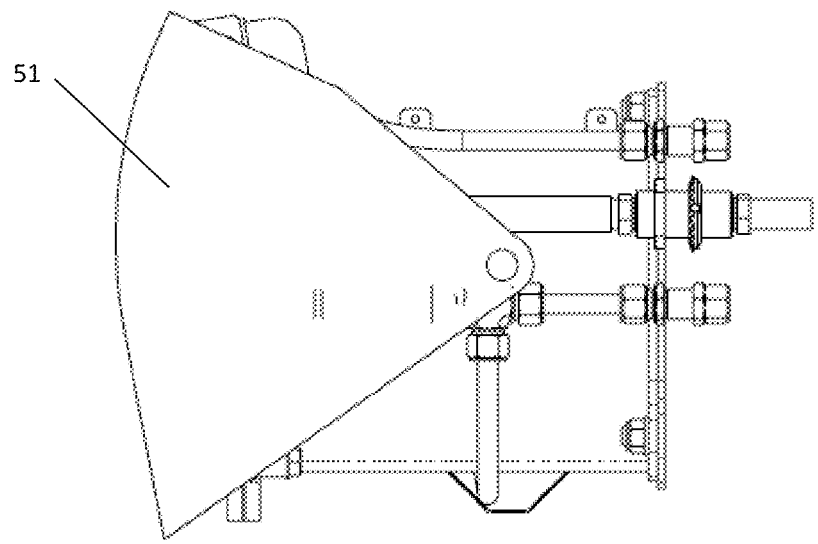
FIG. 10 Illustrates the camera assembly with a protective visor in the lowered closed position.
Figure 11:
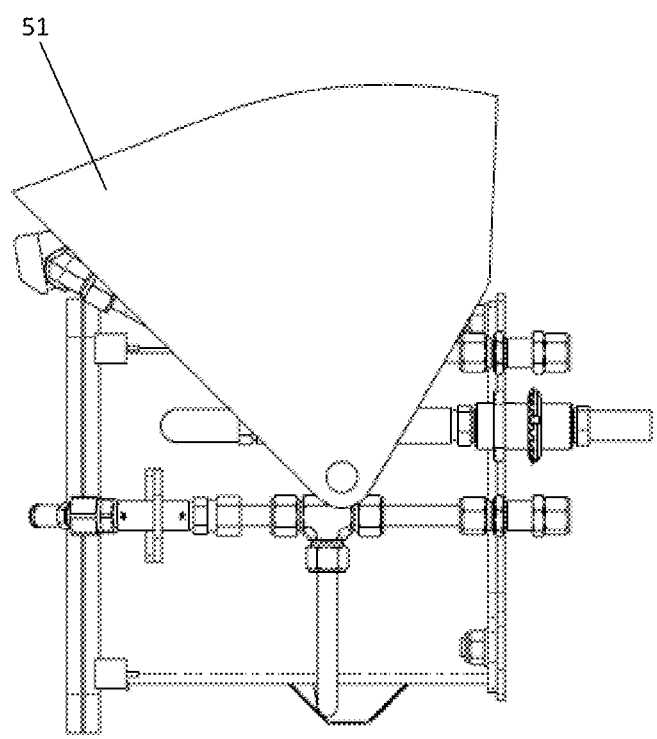
FIG. 11 Illustrates the camera assembly of FIG. 10 with the protective visor in the raised open position.

Referring now to FIGS. 10-11, there is illustrated a further protective cover for the housing and particularly for the glass screen 33. The further protective cover comprises a visor 51. Visor 51 is made of steel or urethane and is hingedly mounted relative to the housing 30 to enable it to move between a lowered protecting position (FIG. 10) where the visor is in front of the glass screen 33 and a retracted position (FIG. 11) where the glass screen is not protected. The visor can protect the glass screen against damage when it is not necessary to monitor the inside of the mill. Thus, when the camera 31 is not in use, the visor will protect the glass from impact. The air and water cleaning could still be constantly operating when the visor is up, even mounted on the inside of the visor to prevent build up of materials on the glass.

FIGS. 12-18 illustrate a second embodiment of the invention which comprise a camera/housing or slightly modified design but still comprising all the essential features of the invention.

Figure 12:
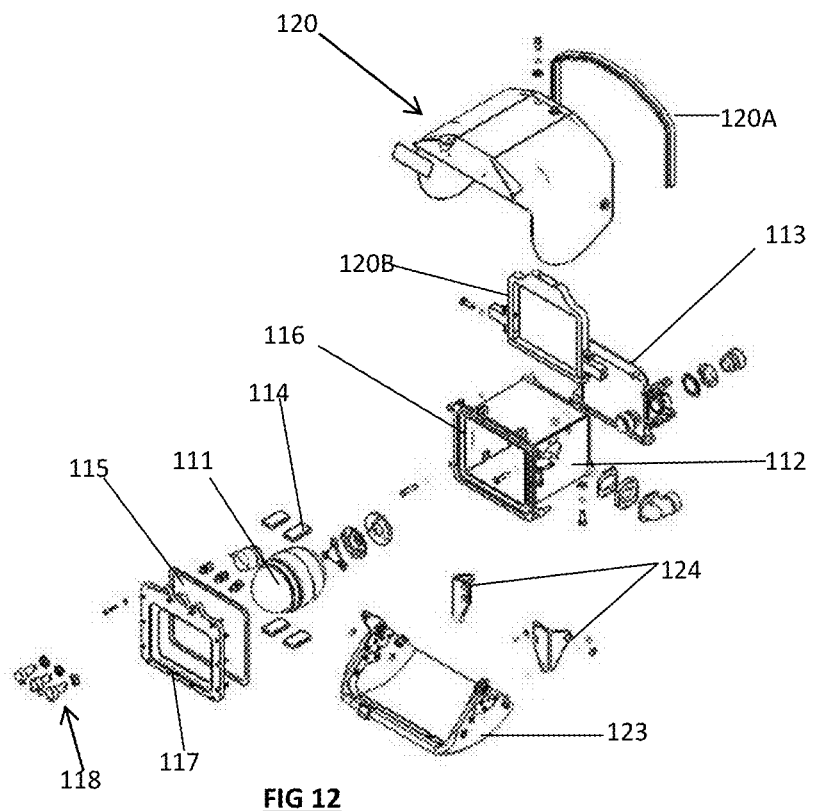
FIG. 12 Illustrates an exploded view of a camera and housing assembly of a second embodiment.

Referring initially to FIG. 12, there is an exploded view of the assembly according to a second embodiment of the invention. The assembly comprises a camera 111 protected within an armoured protective housing 112. The protective housing 112 can be fixed to a steel plate 113 which can be welded or otherwise secured to the flange 14 on the feed chute 11. The camera 111 is supported by cushioning supports 114 in a manner similar to that described above. The camera and cushioning supports are located within the housing 112. The housing 112 is substantially box like and has an open front which is closed off by a glass screen assembly. The glass screen assembly comprises a thick laminated glass plate 115 which locates into a corresponding recess 116 on the front of housing 112 and which is locked in place by a retaining plate 117. The glass plate is siliconed into the frame and a single gasket is used to seal against housing The glass plate can be kept clean by a number of spray nozzles 118A-C (better illustrated in FIG. 13) which are located above the retaining plate and are supported by the retaining plate. The particular design of the nozzles is better illustrated in FIG. 19 and will be described in greater detail below. The nozzles are connected to an water control box 60 via suitable conduits (not illustrated), an example of the water control box (also called a water actuator cabinet) is illustrated in FIG. 2D, and is positioned on the feed chute 11. The nozzles 118 are positioned to spray pressurised water over the front of the glass plate 115. Each nozzle is connected to a water hose/pipe (not illustrated) which is attached to the coupling 64 extending through flange 14 this being best illustrated in FIG. 2E. On the other side of coupling 64 the water hose (not illustrated) continues to the water control box 60. A water supply (not illustrated) is connected to the water control box 60 to provide water to the nozzles 118A-C.

As the mill can get hot in use, cooling means may need to be provided to cool the inside of the housing 112. The cooling means comprises pressurised air passing through conduit 119 and into the housing. In this way the temperature may be controlled and potential fogging of the screen can be dealt with. Conduit 119 can attach to coupling 63 (see FIG. 2E), and this conduit functions primarily to contain the electrical and data wiring to the camera, but if cooling of the housing is required, air car pass through the conduit (in most cases however cooling air will not be required). Moisture absorbing sachets/pellets can be used inside the housing to prevent fogging.

A shroud 120 is attached to the housing (see for instance FIG. 14) and comprises a top portion 121 and a pair of side portions 122. The side portions 122 and function to protect the various hoses and conduits on the outside of housing 122. The top portion 121 provides protection to the nozzles 118. Shroud 120 is screwed or otherwise attached over the top sides of housing 122. Shroud 120 has a seal 120A at the back. The shroud 120 is mounted to a mounting bracket 120B. The bracket is in two halves and clamps onto the housing meaning that modifications to the housing such as welding, drilling and tapping, are not required to mount additional items such as the shroud. The shroud protects the water nozzles and glass screen from mud and debris which drips from within the top of the housing unit itself. This stops the nozzles from 'dragging' mud and contaminants that dripped onto the nozzles into the water stream that was being sprayed at the screen.

As described in the first embodiment of the invention, the assembly of the second embodiment of the invention also contains a protective cover for the glass plate 115 and which can be moved between an extended position where it overlies the glass plate, and a retracted position where the glass plate is free and the camera can take images of the inside of the mill. The protective cover comprises a retractable and extendable visor 123.

The visor 123 in this embodiment is made of urethane to provide impact absorbing capacity and the urethane contains a low friction additive so that mud etc. doesn't stick to it. The urethane can also deform, which in the case of a jammed visor reduces the load on the visor cables and actuators.

Visor 123 will normally be in the extended protecting position and can be retracted briefly to allow the inside of the mill to be viewed prior to returning the visor to the extended protecting position. The visor is hingedly mounted to housing 112 by visor brackets 124 these being best illustrated in FIG. 12. The visor can therefore rotate between a lowered, retracted open position (see for instance the side view of FIG. 17) and a pulled up protecting closed position (see for instance the side view of FIG. 18).

The visor can protect the glass screen against damage when it is not necessary to monitor the inside of the mill. Thus, when the camera 31 is not in use, the visor will protect the glass from impact. The air and water cleaning can still be constantly operating when the visor is up, even mounted on the inside of the visor to prevent build-up of materials on the glass.

Figure 15:
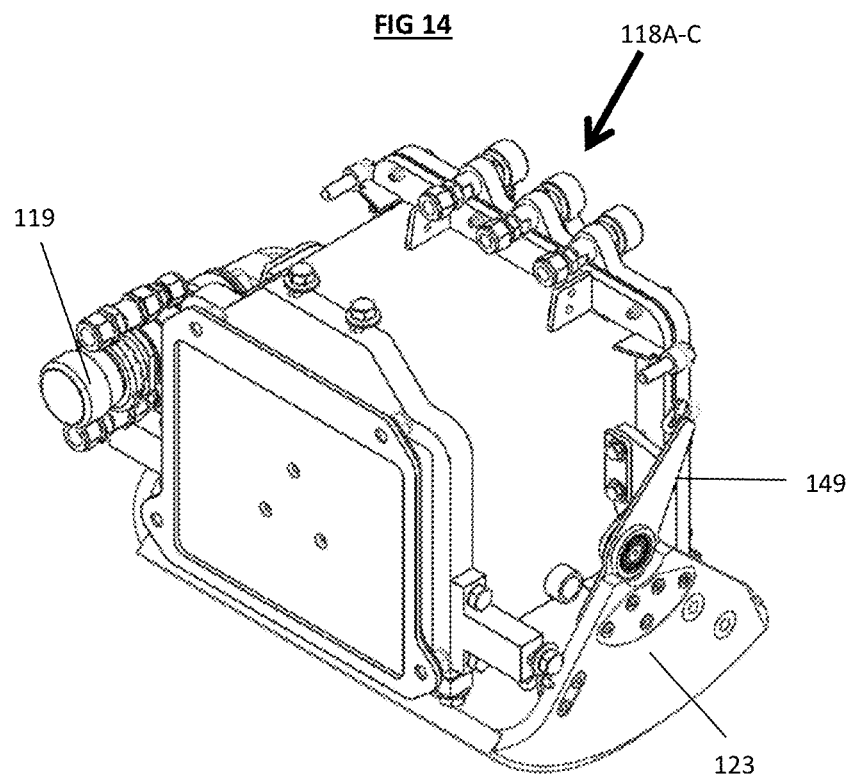
FIG. 15 illustrates a rear view of the assembly of FIG. 13 with the visor retracted.
Figure 16:
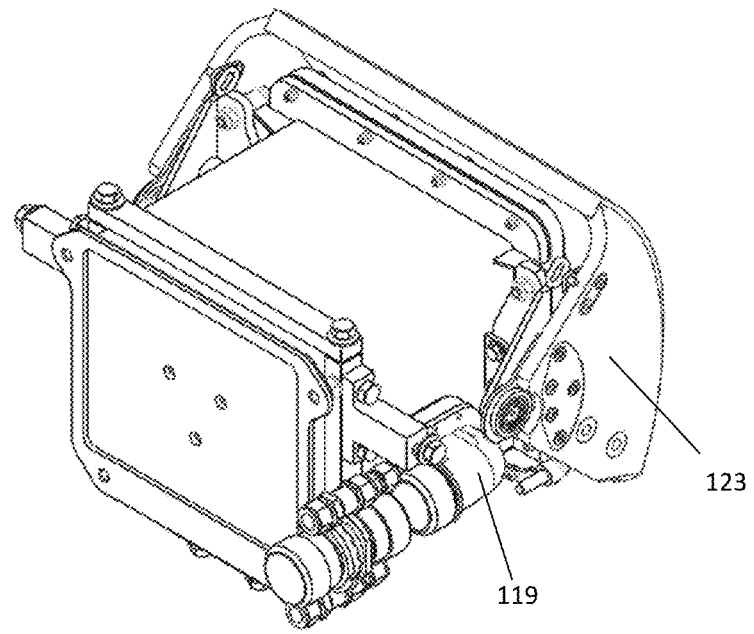
FIG. 16 Illustrates the view of FIG. 15 with the visor extended into the protecting position.

In another example, FIG. 15 (a rear view of the assembly) illustrates the visor 123 in the lowered position and FIG. 16 illustrates visor 123 in the raised protecting position.

Figure 13:
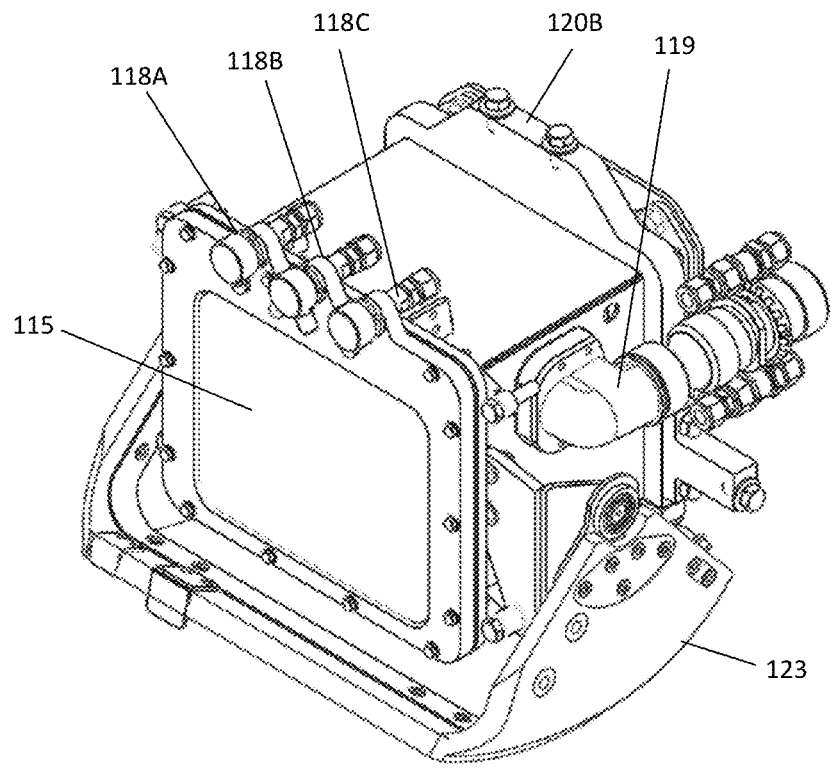
FIG. 13 Illustrates the assembly of FIG. 12 assembled and as a front view and with the visor retracted.
Figure 19A:
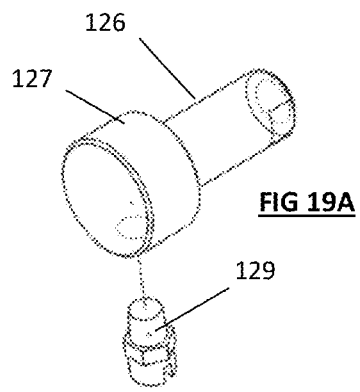
FIGS. 19A-D Illustrate the water nozzles.
Figure 19C:
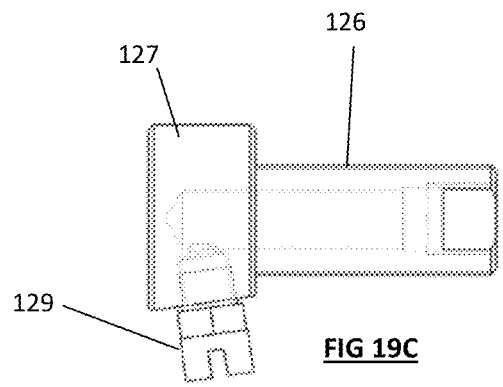
Figure 19B:
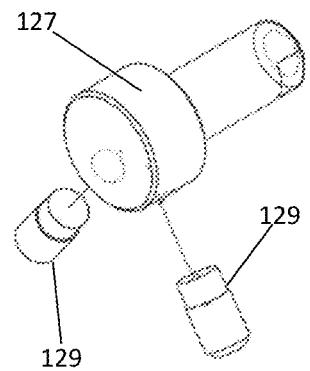
Figure 19D:
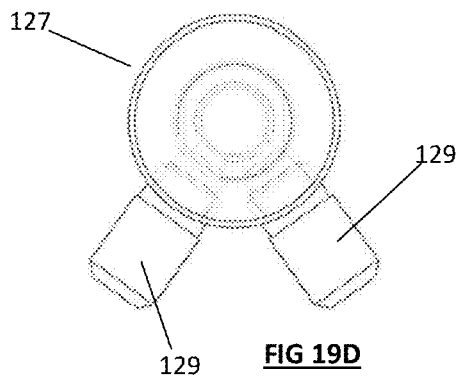

Referring now to FIGS. 19A-19D there is illustrated the nozzle arrangement. Each of the three nozzle arrangements comprises a stem 126 through which water can flow in and which can be trapped under clamping bands of the retaining plate 117 (see FIG. 13) to hold the nozzle in place. A head 127 is attached to the front of stem 126. Referring to FIG. 13, the end nozzles (118A and 118C) are fitted with a single nozzle head, while the middle nozzle 118B contains a pair of nozzle heads. Each end nozzle 118A, C is illustrated in at least FIG. 19A where the head 127 contains a single threaded opening into which a single nozzle head 129 can be threaded. However, and as illustrated in FIG. 19B, the intermediate nozzle contains a pair of threaded openings in head 127 into which a pair of nozzle heads 129 can be fitted. This fitting is such that the nozzle heads are angled relative to each other, and this entire arrangement provides superior cleaning of the glass plate 115.

The nozzles operate under low flow conditions for the majority of time, particularly when the visor is closed. This keeps the screen and internal surface of visor wet so that mud does not stick to it and dry, and conserves water. High flow nozzles operate for more active cleaning when required.

Figure 20:
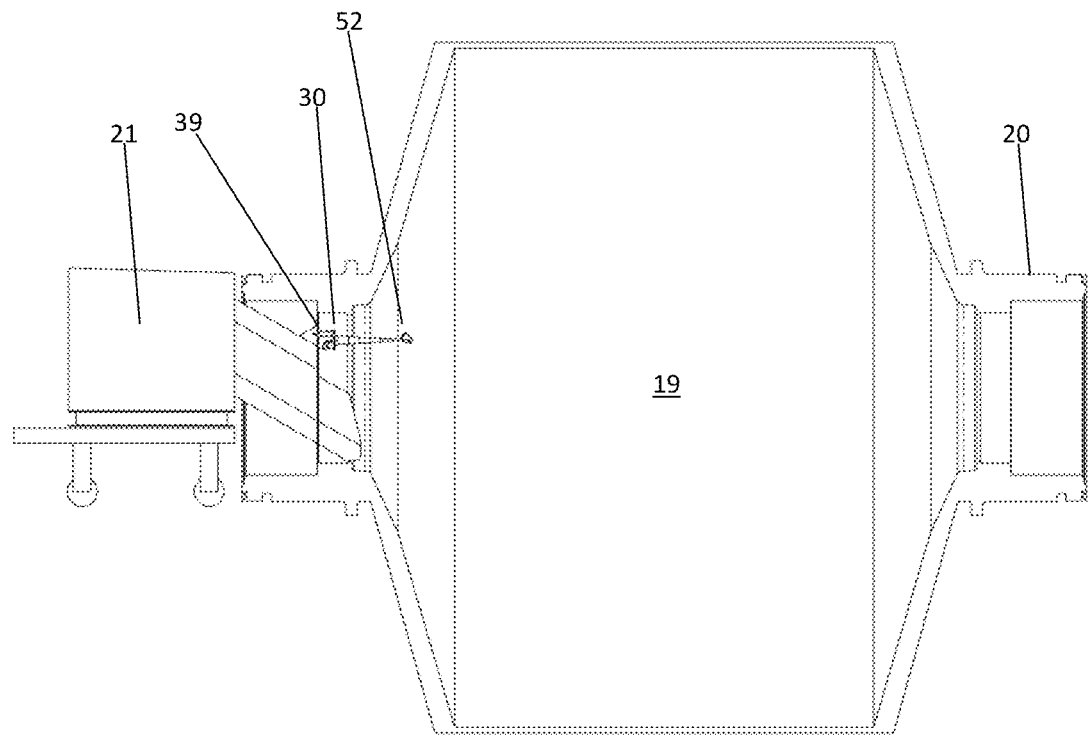
FIG. 20 Illustrates the ball mill of FIG. 2 containing a telescopic camera assembly.
Figure 21:
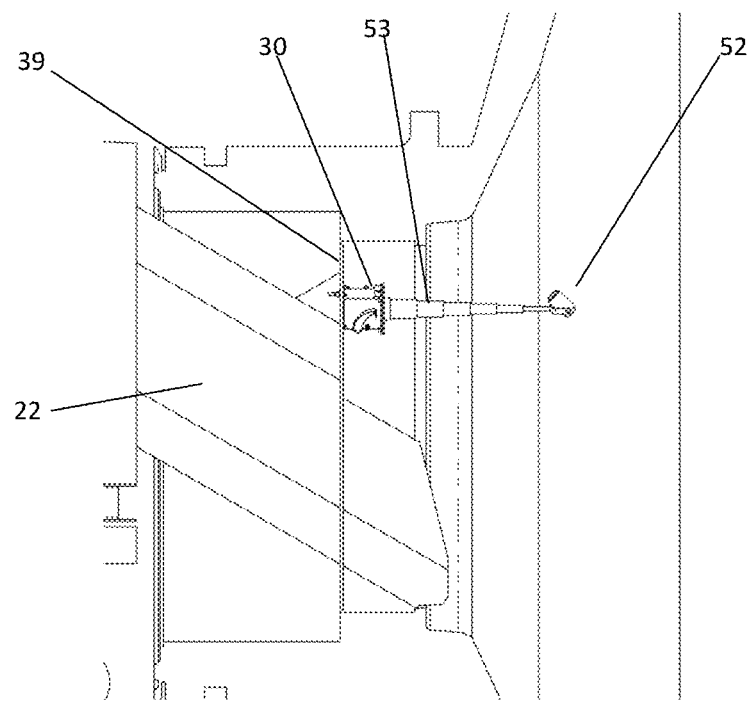
FIG. 21 Illustrates the telescopic camera assembly in greater detail.
Figure 22:
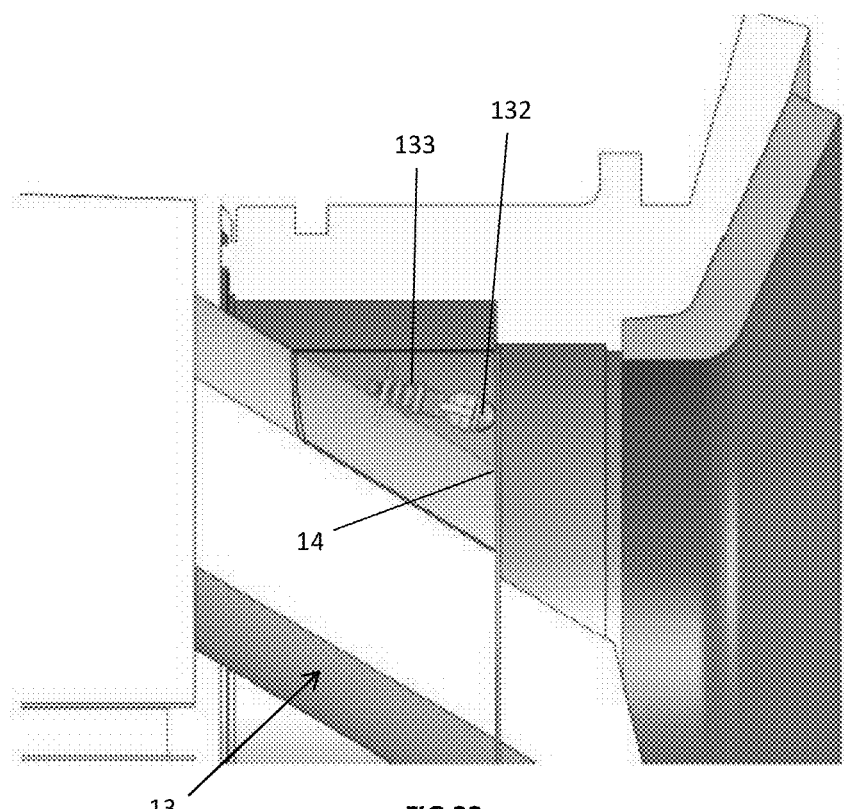
FIGS. 22-23 Illustrate a scissor like telescoping camera according to a further embodiment.
Figure 23:
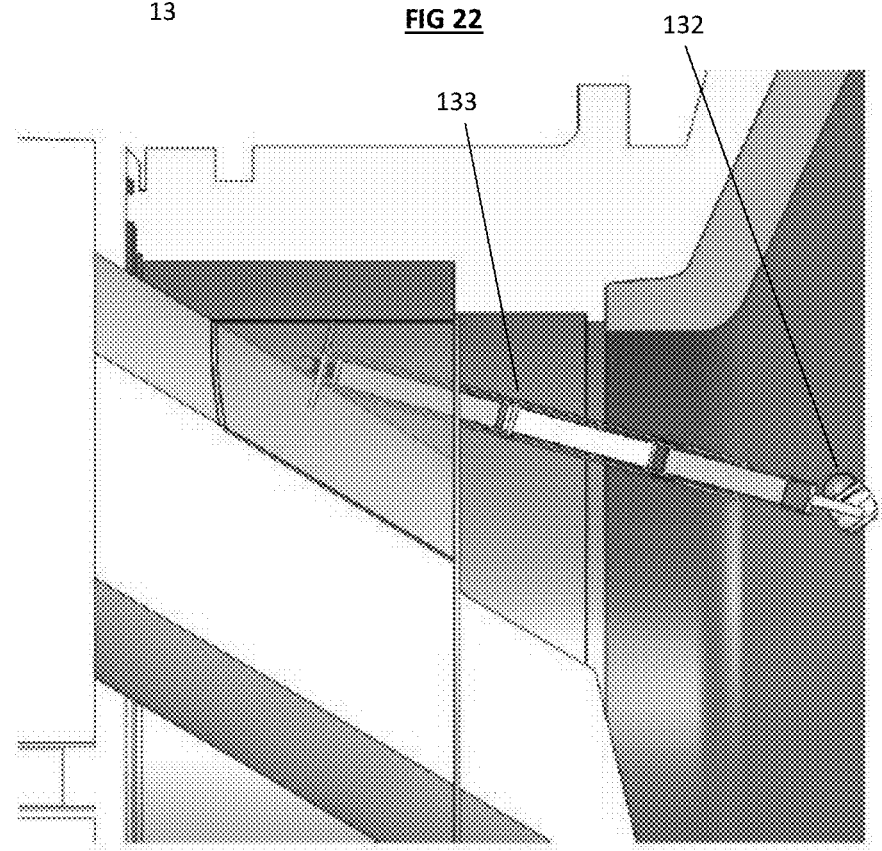

Referring now to FIG. 20 and FIG. 21, the housing 30 may include a removable front to enable a camera 52 to be attached to a telescoping arm 53 (or other type of expandable and retractable member). This enables the camera 52 to be positioned further in the mill to enable the camera to see parts of the mill which are not visible when the camera is fixed in the housing.

FIGS. 22-25A-C illustrate a further embodiment of a telescopic arrangement. In this embodiment, a camera 132 is attached to the end of a telescoping arm 133 with the arm being in the retracted position in FIG. 22 and in the extended position in FIG. 23. Camera 132 can rotate at the end of the telescoping arm (see for instance FIG. 23) to provide image data from areas in the mill not readily viewable using the housing arrangement as illustrated above. In the retracted position (see FIG. 22) the camera and the arm are located behind flange 14 on the feed chute outlet 13. This area of the flange can be provided with a removable plate (not illustrated) to enable the camera and the arm to extend through flange 14 and into the mill. When in the retracted position (FIG. 22), the plate is attached to protect the camera and the arm from damage.

The telescoping action is caused by a scissor like arrangement which comprises a number (in this case three) arm members 135A-C hingedly attached to each other. A camera 132 is attached to the end of the outermost arm member 135A. The inner most arm member 135C is fixed to a backing plate 137 but still in a hinge manner. A hinged actuator frame assembly 138A-B couples to each arm member. The lowermost frame assembly 138A is connected to the piston of a ram. Actuation of the ram therefore causes extension and retraction of the scissor like arrangement. The ram may be replaced by a rotating threaded rod and a travelling nut or by other mechanisms or means to extend and retract the arm members. FIG. 24 illustrates the arrangement attached to the elongate outlet 13 of the feed chute 11.

A scissor arrangement is quite stable, and this is important for operations such as laser scanning and similar, where movement of the scanning device will produce inaccurate results. Extension and retraction of the arms can be done with a single actuator.

In a variation, a second camera in its protective housing may be mounted in a safe area in the discharge area of the mill to enable other parts of the mill to be monitored.

A second protective housing can be mounted adjacent the camera housing and which contains a light source. The light source may comprise an IR emitter and the camera may be an IR camera. The second housing may be substantially identical as described above with reference to the camera housing and can contain the air knife and/or water nozzles, a visor and air cooling. Alternatively, there could be two or more lights, or an array of lights, around the mill entry. Their enclosures will of course be suited to their size, shape and mounting position. A polycarbonate screen for the lighting housing can be used instead of the laminated glass screen, as scratches on the screen for the lighting do not severely adversely affect illumination of the inside of the mill.

The camera and lights could be in the same enclosure, or the lights could be integral with the camera. Future references to the "camera" will also mean to include the lights, even if they are not mentioned specifically.

Installation of a heater or fan could be used for temperature controlling the camera.

The Wifi unit could be replaced with a hard wired cable connection.

The camera may be either a still camera or a video camera. Furthermore, the camera that has been used in the preferred embodiment that has been described herein includes a microphone. Consequently, it is possible for an operator to remotely view and hear what is going on inside the mill which adds greatly to understanding of the footage that is being captured. Furthermore, the sound inside the mill is different to that which can be heard outside of the mill. The interior sound may be useful in gauging the mill's performance.

Figure 32:
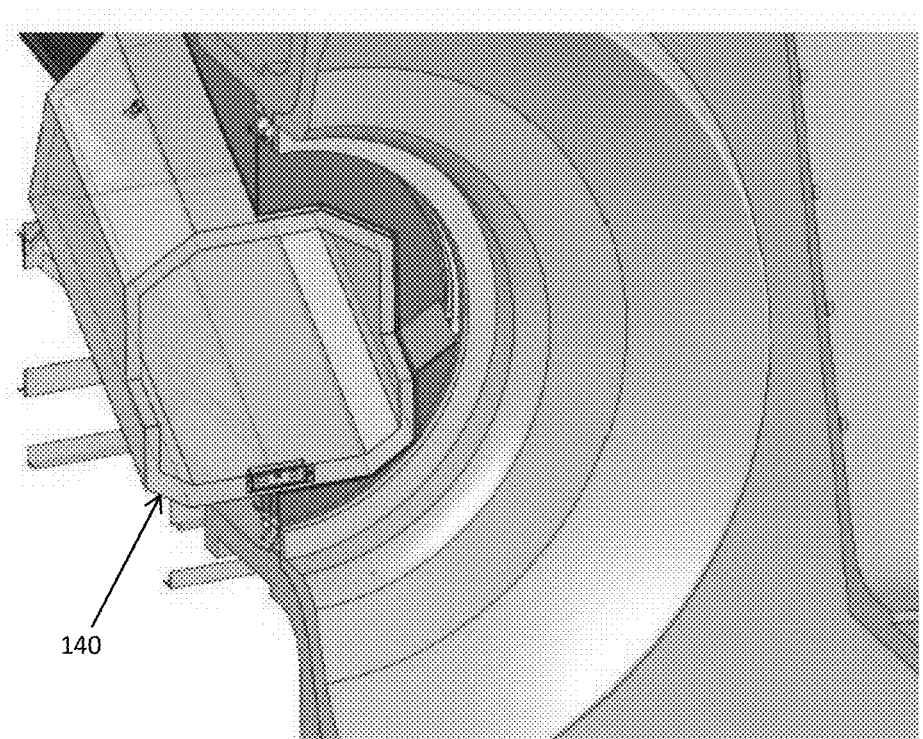
FIGS. 32-33 Illustrate an alternative placement of a housing containing monitoring devices such as a camera and lights.
Figure 33:
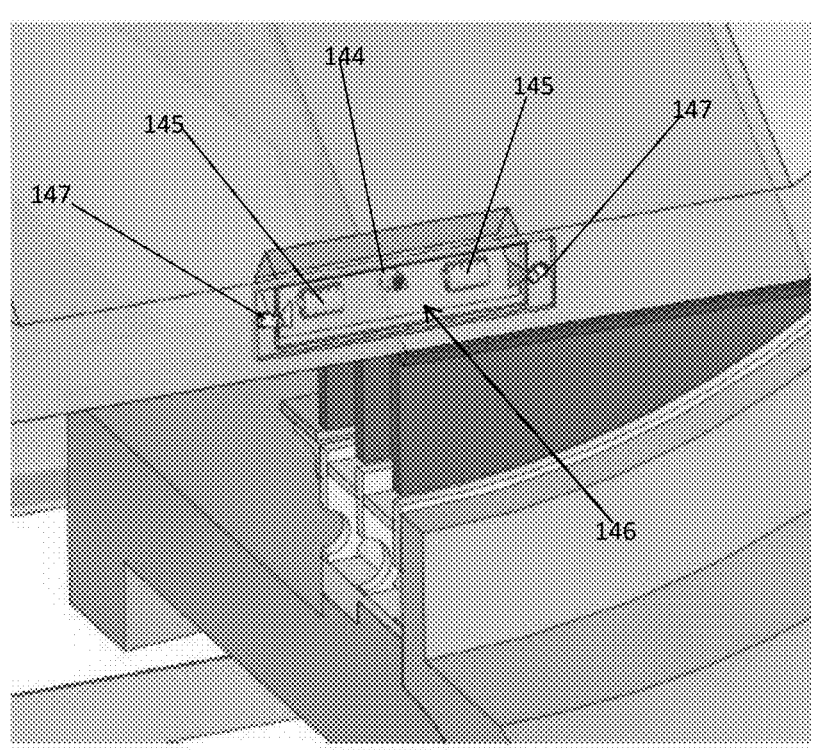

FIGS. 32 and 33 Illustrate a feed chute outlet 11 having a thick liner about the outer rim 140 and a recess formed in the liner in which is located an elongate housing 143 containing a camera 144 and an illumination device 141 adjacent each side of camera 144. A strong armoured glass plate 146 can again be provided to protect the camera and the illumination devices. Water nozzles 147 are provided adjacent each edge of the housing to clean the exterior of the glass plate 146. In this embodiment of the invention, the housing 143 may be in addition to the camera housing and illumination housing described in the previous embodiments or may be instead of the camera housing and the illumination housing described in the previous embodiments.

Figure 17:
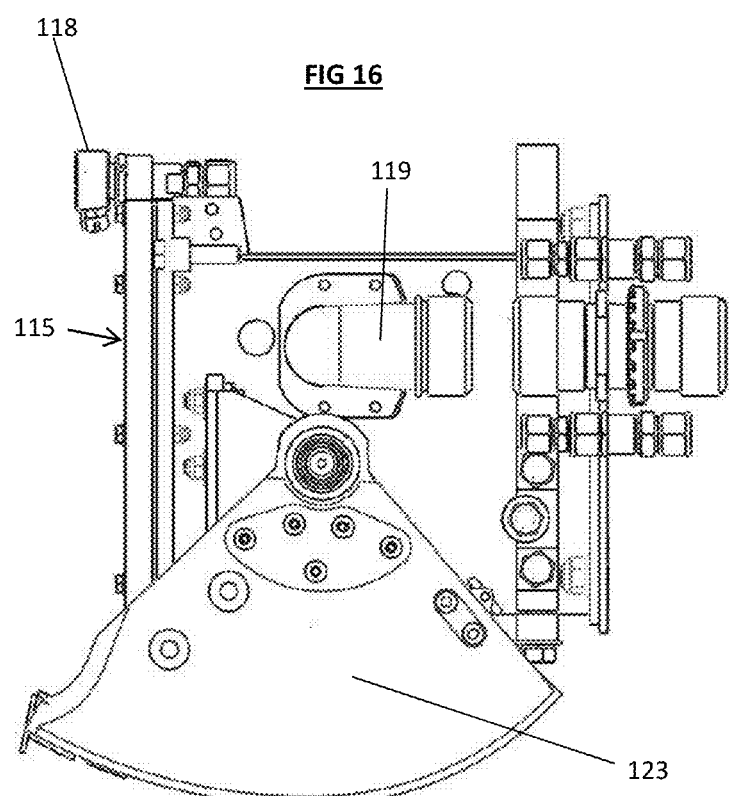
FIG. 17 Illustrates a side view of the assembly with the visor retracted.
Figure 18:
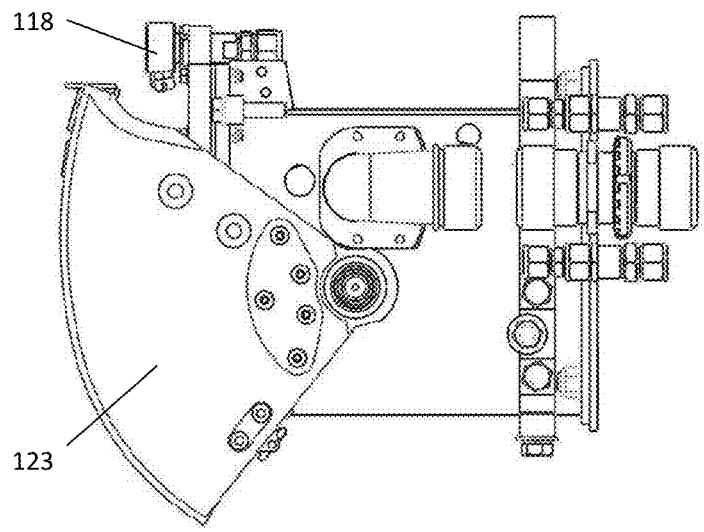
FIG. 18 Illustrates the view of FIG. 17 with the visor in the extended protecting position.
Figure 28:
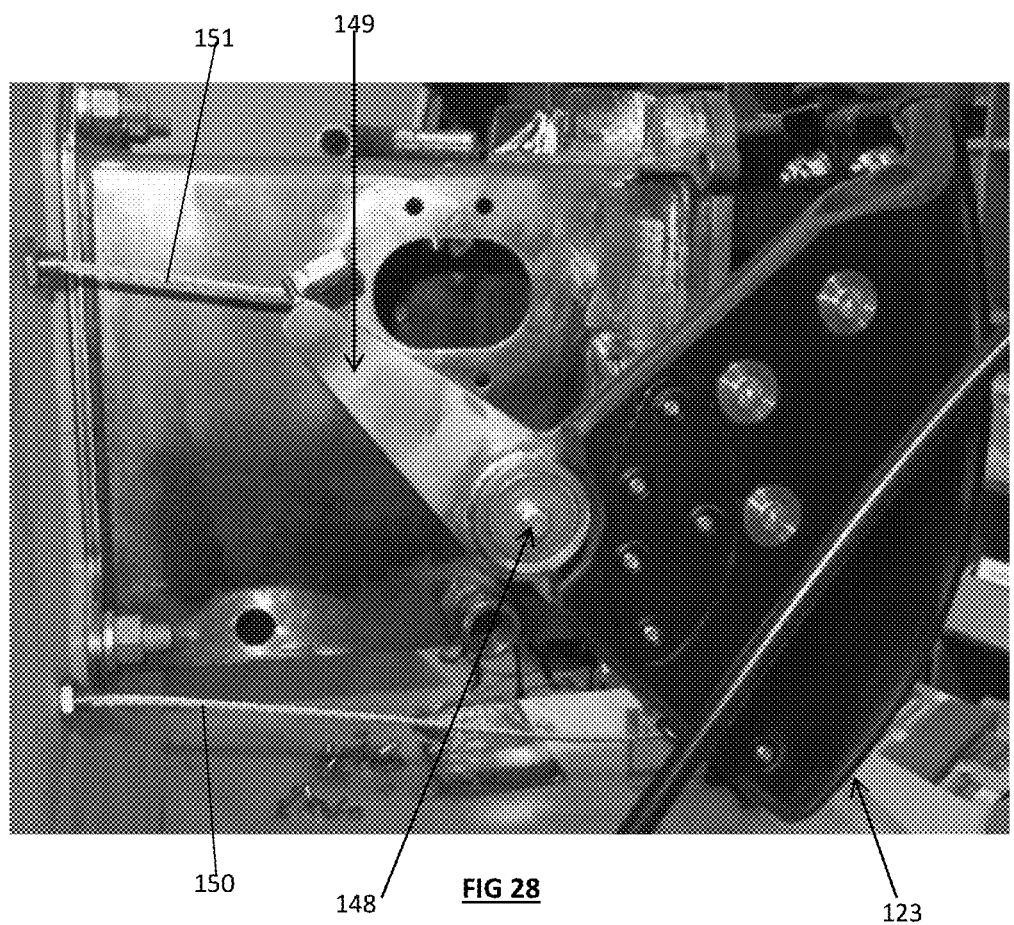
FIG. 28 illustrates the camera or illumination housing and particularly illustrates the visor operating cables.

Referring to FIG. 28, there is illustrated a side view of a housing of the type described above and which can contain a camera, or an illumination device or both. The front of the housing is protected by a visor 123. The visor is pivotly mounted relative to the housing. Extending from about the visor pivot pin 148 is an arm member 149. Arm member 149 extends generally at right angles to the visor. Attached to a lower part of visor 123 is a first pull cable 150. Pull cable 150 extends through flange 14 (not illustrated). Pulling of cable 150 will cause visor 123 to be pulled downwardly into its retracted position (for instance as illustrated in FIG. 17). A second pull cable 151 is attached to the end of arm member 149. Pulling of the second pull cable 151 will cause the visor 123 to be rotated upwardly into the protecting position as illustrated in FIG. 28 and also as illustrated at least in FIG. 18. The cable operating system is considered simple yet reliable to operate the visor.

The visor can have internal markings to be able to position the camera and perform diagnostics with the visor closed. These markings are typically in the form of a representation of the inside of the mill. It is advantageous when opening the visor, particularly with the mill running, to have it open as short a time as possible. Pre-positioning the camera assists this greatly.

Figure 34:
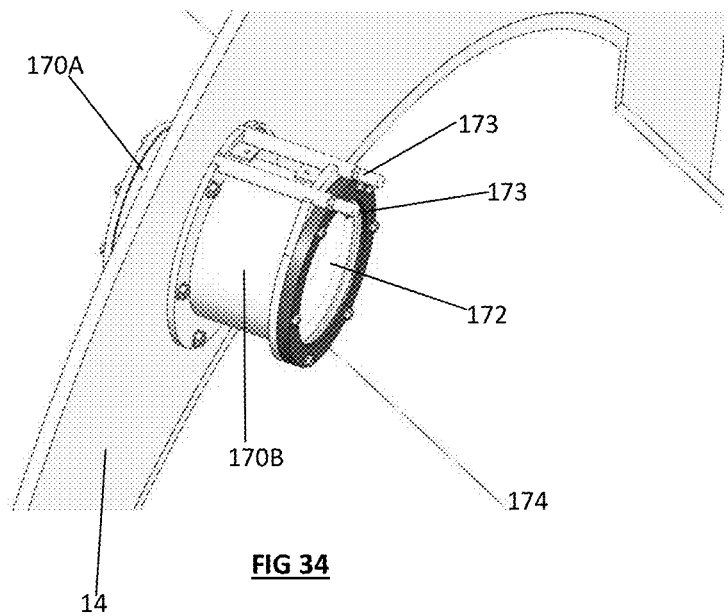
FIGS. 34-35. Illustrate a further embodiment of the invention where the housing projects partially through the flange.
Figure 35:
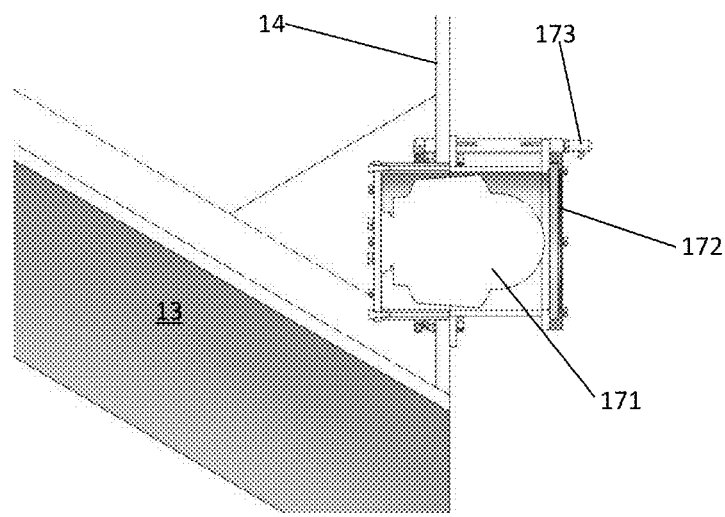

FIG. 34 and s5 illustrate a further embodiment of the invention. In this embodiment the flange 14 is formed with an opening through which a protective housing 170 can pass. In FIG. 34, part of the housing 170B is in front of the flange 14 and part of the housing 170A is behind the flange 14. The housing can contain a camera 171 (see FIG. 35) or illuminative device as described previously. The front of the housing has a view screen 172 which can be as described previously and which is held by a retaining plate 174. Water nozzles 173 are provided to keep the screen clean. Housing 170 can be adjustably positioned to vary the amount that extends in front of and behind the flange 14. If the elongate outlet 13 (see FIG. 35) of the feed chute 11 is large and the flange 14 is smaller, there may not be sufficient space behind the flange for the housing (the housing will strike the outlet wall 13) to enable the housing to be substantially retracted behind the flange with only a small portion projected through the opening and in front of the flange. Thus, in the previously embodiments, the housing has been attached to the front of the flange to enable the housing to be larger and more armoured, but the embodiment of FIGS. 34 and 35 illustrate that there may be circumstances where the housing can slidingly extend through an opening in the flange and then be clamped into the desired position. The various water and data conduits may be as described in previous embodiments. The screen 172 may be protected by a visor which is not illustrated in FIGS. 34 and 35 but which may be as described in previous embodiments.

Figure 29:
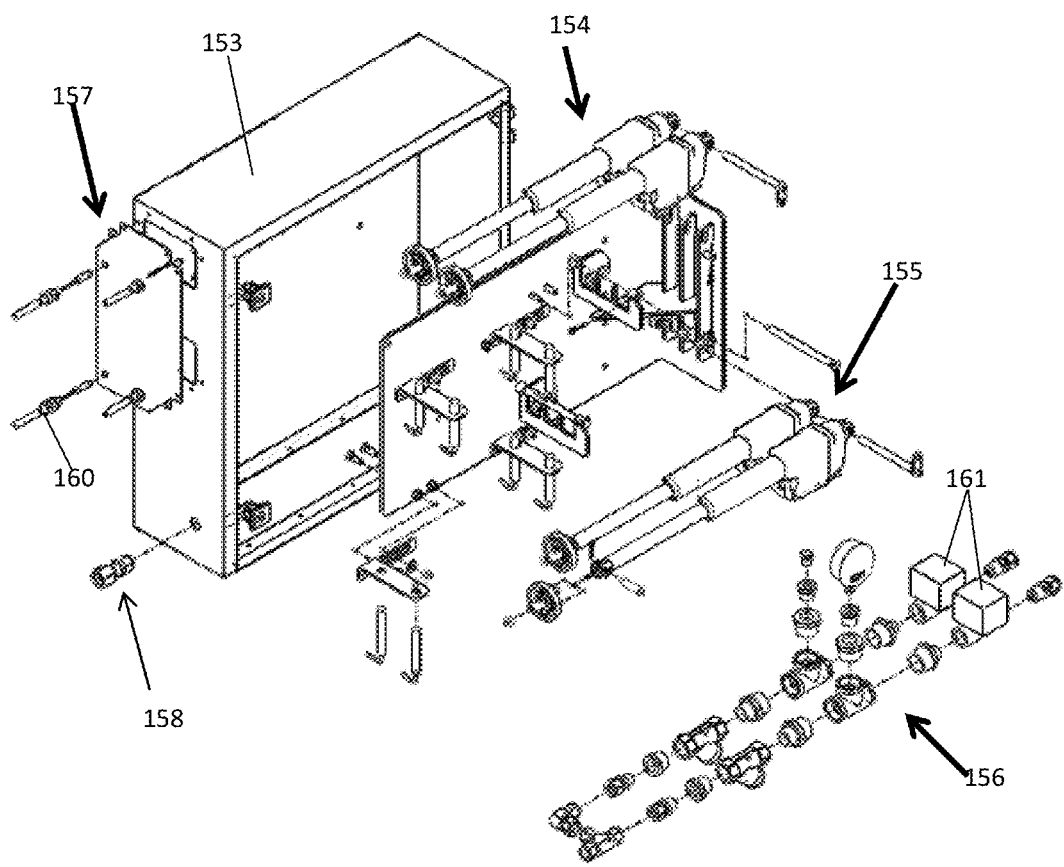
FIGS. 29-30 Illustrate a control cabinet to operate the visor and the nozzles.
Figure 30:
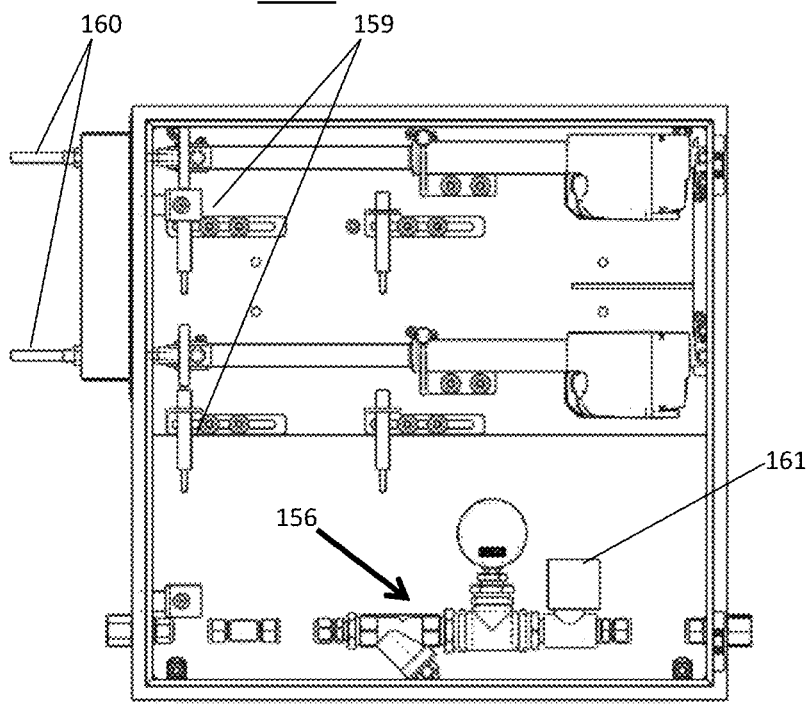
Figure 31:
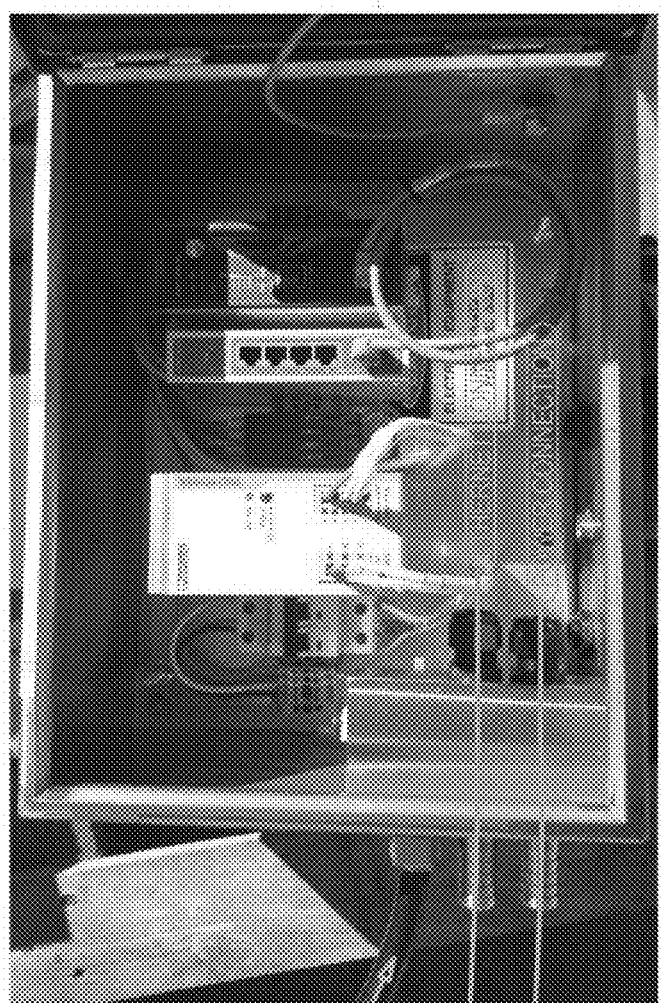
FIG. 31 Illustrates a simple electrical control cabinet to control the cooling air, camera and lights.

FIGS. 29 and 30 illustrate the main components in the cabinet 60 containing the water actuator controls and cable operators. The cabinet 60 includes two pairs of linear actuators 154, 155. Each pair of actuators operates the pull cables of the visor on a particular housing. In the preferred embodiment, there is provided a first housing containing a camera and a second housing containing the light emitter. An example of this is illustrated at least in FIG. 1 as reference numerals 26 and 31. Each housing contains a pivoting visor as described above. Each pivoting visor is operated by a pair of cables with one cable being pulled to close the visor and the other cable being pulled to open the visor. Thus, the first pair of actuators 154 can function to operate the visor on one of the housings (for instance the camera containing housing) and the second pair of actuators 155 can function to operate the visor on a second housing (for instance the lights containing housing). Each of the four actuators can move telescopically from the extended position illustrated in FIG. 29 and FIG. 32 to a retracted position (not illustrated) where the actuator arms have retracted telescopically. Each of the four actuators is attached to a respective pull cable (the cables not being illustrated), and the four cables (two cables for the visor on the camera housing, and two cables for the visor on the light housing) pass through respective tubular sleeves 160 on a box like mount 157. In this manner, the visors can be operated between the open and closed positions.

The linear actuator strokes are set by proximity switches which are located to correctly position the visor in the open and closed positions. Feedback from the actuators is provided by either a) timing the stroke and if it doesn't reach the end of stroke within a set time then an alarm is triggered, or b) load sensing such as current sensing which indicates a jammed condition and also triggers an alarm.

In a variation the visor can be actuated by an internal actuator mounted directly onto the housing and operated by an electric motor with worm drive gearbox.

Cabinet 60 additionally contains water piping 156 with the passage of water being controlled by a solenoid 161. In the particular embodiment, a pair of water flow pipes is provided each operated by a solenoid 161. This enables the water to the cleaning nozzles to be operated remotely from the mill and provides redundancy in case a solenoid fails.

An auto-shut feature is provided, which automatically shuts both visors after being open for 5 minutes (this duration is adjustable). This prevents the user from accidentally leaving the visors open after looking at the camera vision.

The camera and visor operation can be linked to the mill r.p.m. output provided by the mine site mill control system. This enables the visors to open up automatically and the cameras begin recording footage if the mill rpm slows to less than a predetermined (but adjustable) value, for example, 3 rpm, and to shut automatically above this predetermined value. These features enhance the protection of the screens by the visors.

Secondary cameras are preferably provided in the housings—these may be a lower resolution and have less functionality however they provide some degree of redundancy. The cameras also are particularly useful for internal diagnostics, for example checking the visor operation, damage to the viewing screen or leaks into the housing. These secondary cameras are fixed cameras.

The mill may include further sensors added for gather additional information of conditions inside the mill, such as temperature and humidity.

The separation of lights from the camera is preferred so that the lights do not illuminate debris or steam directly in front of the camera and block vision. Thus separate housings for the camera and lights is preferred.

The housing containing the camera is preferably on the side of the mill from which the mill charge was being thrown (the "up" side), and the lighting housing on the side of the mill on which the mill charge was landing (the "down" side). This provides better safety for the more expensive camera containing housing.

The grinding mill according to the embodiment of the invention has the following advantages:
1. A permanently mounted monitoring device inside the mill
2. Advantageously, the monitoring device it is located on the feed chute flange. It may be referred to as being part of the feed chute.
3. Receive information from the device and send instructions to it without having to pull the feed chute from the mill.
4. The monitoring device is in a protective housing. The housing includes cleaning features able to be remotely activated.

5. The monitoring device may be extended into the mill out of its protective housing when safe to do so, for example if the mill is stopped.
6. It may monitor multiple things simultaneously—vision, sound, temp, humidity etc.
7. The primary purpose of the monitoring device is to perform functions that would normally require the feed chute to be removed so that personnel can enter the mill. The main resulting benefits are a time (money) saving and safety.

Figure 39:
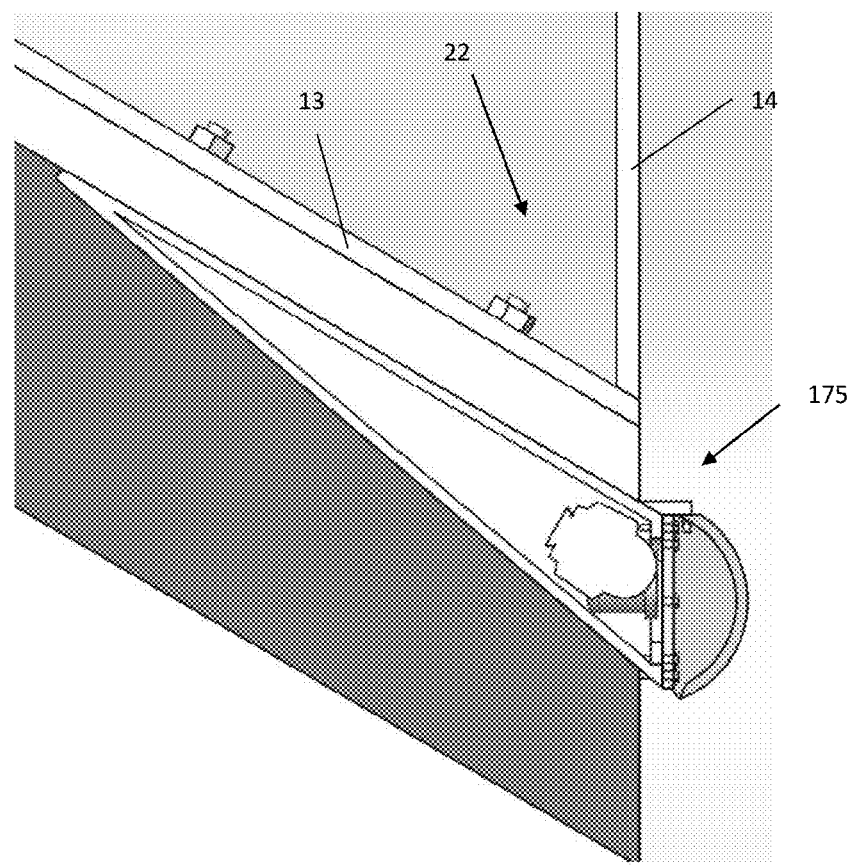
FIG. 39 Is a sagittal cross section through the mounted camera assembly of FIG. 37 with protective visor in a closed position over a screen of the housing.

Those skilled in the art will realise that variations to the previously described embodiment of the invention are possible. For example, referring now to FIG. 36 there is depicted a camera assembly 175 according to a further embodiment of the invention. The camera assembly 175 is adapted to be mounted as shown in FIG. 37 to an underside of the top of the outlet 13 of chute 11 rather than to the flange 14. The camera assembly 175 includes a wedge shaped housing 177 that diverges from an edge 179 to the camera window 181. Within the housing and inside the window 181 there are mounted a camera 183 and two light sources 185 and 187. The camera assembly includes a remotely operable protective visor 189 which is shown in an open position in FIG. 36, wherein the window 181 is not covered by the visor, to a closed position, as shown in FIGS. 39 and 40 wherein the visor 189 covers the window.

It is possible to mount the camera assembly 175 on the underside of the chute because the vast majority of material that proceeds through the chute 11 flows through the lower portion of the outlet 11 so that there is little if any wear on the underside of the ceiling of outlet 11. In any event, the wedge shaped housing assists in reducing impact to the camera 183 and light sources 185, 187. Positioning the camera assembly on the ceiling of the chute outlet places the camera very central in the mill which provides for a good viewing range. Finally, a significant length of the chute outlet 13 may be used to house an extension arm on which the camera might be extended further into the mill when it is not running.

Figure 36:
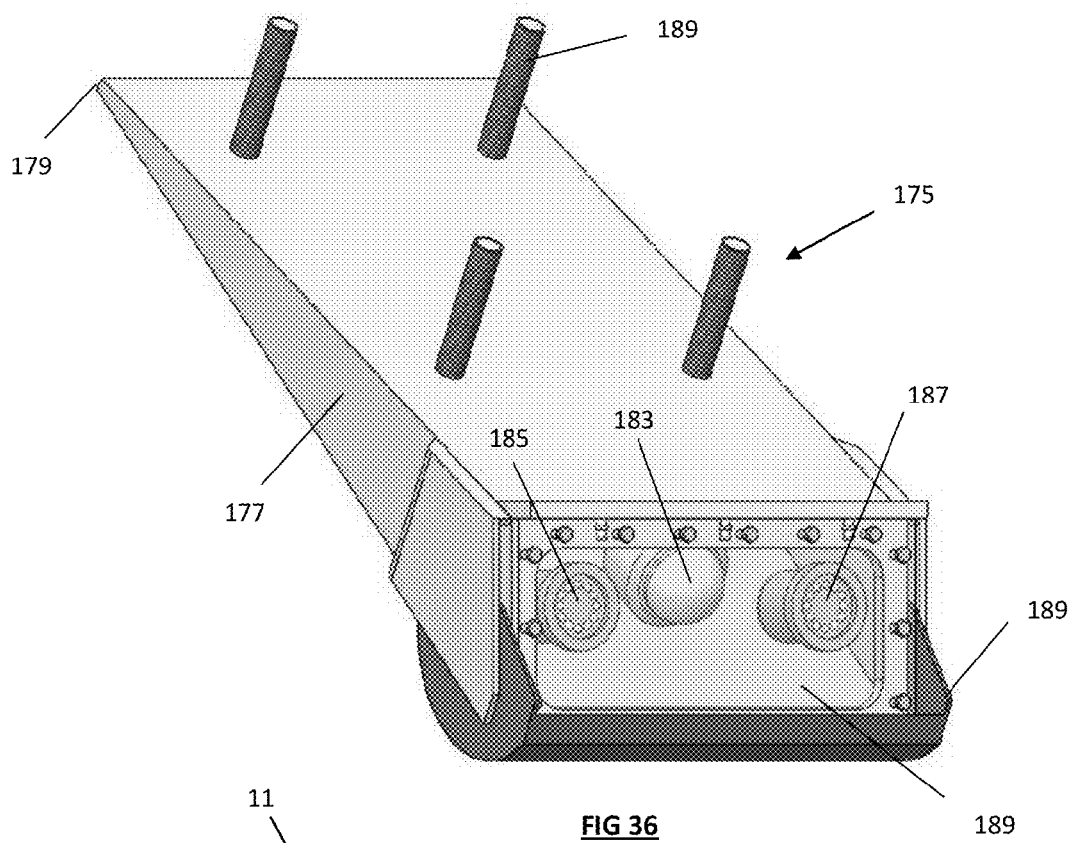
FIG. 36 Illustrates a camera assembly according to a further aspect of the invention for mounting on a ceiling of the chute outlet.
Figure 37:
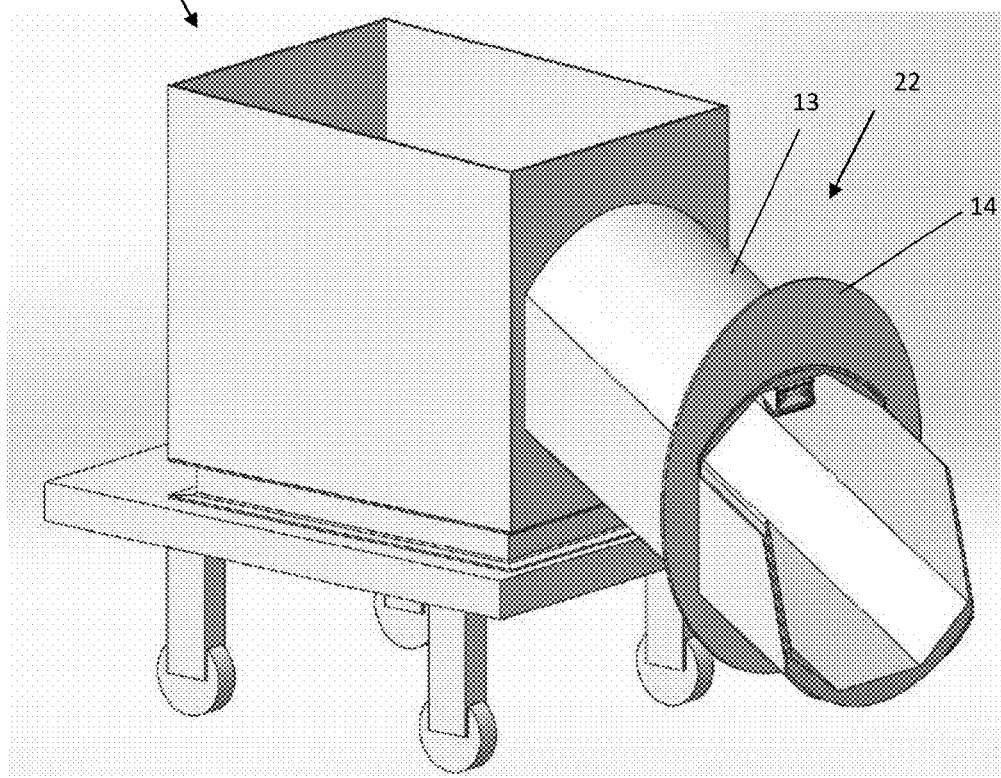
FIG. 37 Illustrates the camera assembly of FIG. 36 mounted to the underside of the ceiling of the chute outlet.
Figure 38:
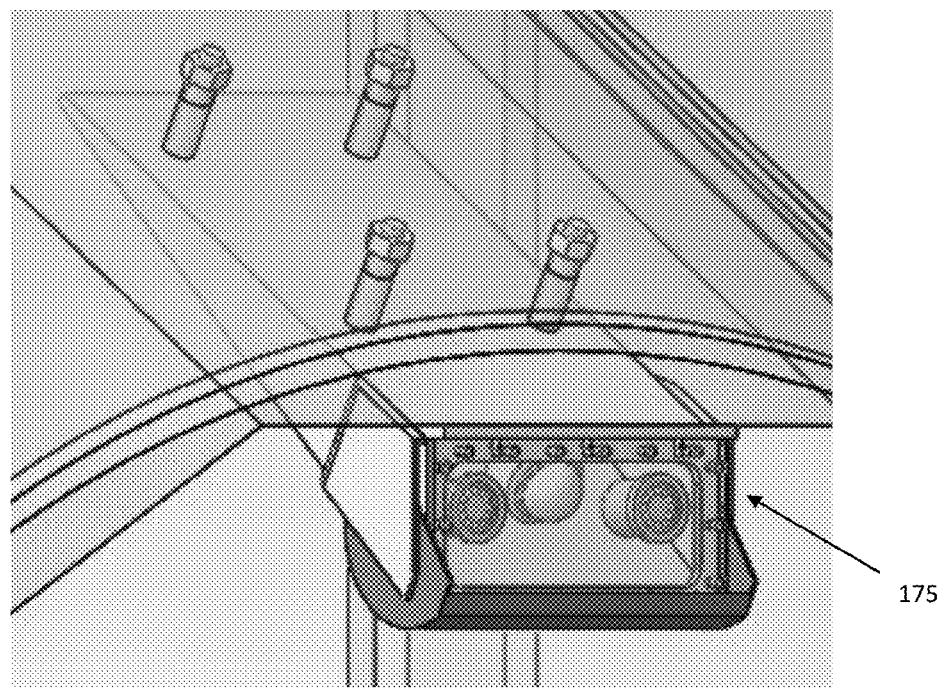
FIG. 38 Is a detailed and partially transparent view of the camera assembly as shown in FIG. 37 showing the protective visor in the open position in which it does not occlude the screen of the camera assembly.

In the embodiment of FIG. 36 the housing 175 has mounting studs 189 that in use pass through the ceiling of the chute outlet to fasten the camera assembly 175 thereto. Of course, the camera assembly may also be mounted with other arrangements such as magnets. In that event the topside of the housing includes a number of powerful permanent magnets that are attracted to the ceiling of the chute outlet with sufficient force to hold the assembly in place in the face of occasional impacts from material travelling down the chute outlet 13.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A feed chute for a grinding mill, the feed chute having an outlet assembly including an elongate outlet adapted for insertion into an entry opening of the main grinding body of the grinding mill in use, at least one monitoring device fastened to the outlet assembly at a position for viewing an interior of the grinding mill in use, and at least one illuminating device supported by the outlet assembly for illuminating the interior of the grinding mill in use, the monitoring device and illuminating device comprising a protective housing, a first transparent sealed viewing screen on the housing wherein the first viewing screen is positioned for allowing the monitoring device to view and monitor the interior of the main grinding body therethrough, a second transparent sealed viewing screen on the housing to enable the illuminating device to illuminate the interior of the main grinding body, at least one nozzle adapted to spray liquid onto the first and second screens to clean the screens, a moveable protective visor adapted to movement between a protection position where the visor protects the first and second screens from impact damage and reduces the amount of debris that is able to reach the viewing screen thereby keeping the viewing screen cleaner, a non-protection position where the visor does not protect the first and second screens, wherein the nozzle and the visor are configured to allow the nozzle to pass liquid against the screen when the visor is in the protection position, and a shroud attached to the housing, the shroud comprising a top portion and a pair of side portions, wherein the shroud is adapted to protect the nozzles and screens from mud and debris.

2. A feed chute for a grinding mill according to claim 1, wherein the elongate outlet assembly includes a flange extending outwardly about the elongate outlet to at least partially seal the entry opening when the outlet is inserted into the entry opening wherein said monitoring device is supported on the flange and thereby not in contact with material passing through the elongate outlet.

3. The feed chute of claim 1 wherein the at least one monitoring device comprises a camera.

4. The feed chute of claim 1 wherein the at least one nozzle is on the housing.

5. The feed chute of claim 1, wherein the at least one illuminating device is supported by the flange and located in a protective housing.

6. The feed chute of claim 1 wherein the housing is adapted for mounting to a ceiling of the outlet with a screen arranged at one end thereof, the housing including said monitoring device and at least one illuminating device.

7. The feed chute of claim 1 wherein the housing is supported on a front side of the flange.

8. The feed chute of claim 1 wherein the at least one monitoring device is arranged for operation remotely from the feed chute.

9. A housing adapted for attachment to an outlet assembly of a feed chute for a grinding mill, the housing able to accommodate a camera and an illuminating device, the housing comprising a first sealed transparent screen to enable a camera in the housing to record information passing through the first screen a second sealed transparent screen to enable radiation from the illuminating device to pass through the second screen, at least one nozzle to pass liquid against the first and second screens to clean the screens, a protective visor adapted to movement between a protection position where the visor protects the screen from impact damage and reduces the amount of debris that is able to reach the viewing screen thereby keeping the viewing screen cleaner and a non-protection position where the visor does not protect the screen, wherein the nozzle and the visor are configured to allow the nozzle to pass liquid against the screen when the visor is in the protection position, and a shroud attached to the housing, the shroud comprising a top portion and a pair of side portions, wherein the shroud is adapted to protect the nozzles and screens from mud and debris.

10. The housing of claim 9, wherein the visor is hingedly mounted to the housing and substantially covers the screen when in the protection position and is substantially away from the screen when in the non-protection position.

11. The housing of claim 9 including a camera located within the housing.

* * * * *